US008265982B2

(12) United States Patent
Mathews et al.

(10) Patent No.: US 8,265,982 B2
(45) Date of Patent: Sep. 11, 2012

(54) SYSTEMS, METHODS AND COMPUTER PROGRAM PRODUCTS FOR MODELING COSTS AND PROFITABILITY OF A GOOD

(75) Inventors: Scott H. Mathews, Seattle, WA (US); Kyle M. Nakamoto, Seattle, WA (US)

(73) Assignee: The Boeing Company, Chicago, IL (US)

( * ) Notice: Subject to any disclaimer, the term of this patent is extended or adjusted under 35 U.S.C. 154(b) by 199 days.

(21) Appl. No.: 12/603,244

(22) Filed: Oct. 21, 2009

(65) Prior Publication Data
US 2010/0042480 A1 Feb. 18, 2010

Related U.S. Application Data

(63) Continuation of application No. 10/453,727, filed on Jun. 3, 2003, now Pat. No. 7,627,495.

(51) Int. Cl.
*G06F 17/30* (2006.01)
(52) U.S. Cl. .................................... 705/7.29
(58) Field of Classification Search ............... 705/7.11, 705/7.29
See application file for complete search history.

(56) References Cited

U.S. PATENT DOCUMENTS

| 5,377,095 | A | 12/1994 | Maeda et al. |
| 5,692,233 | A | 11/1997 | Garman |
| 5,710,578 | A | 1/1998 | Beauregard et al. |
| 5,960,407 | A | 9/1999 | Vivona |
| 6,061,662 | A | 5/2000 | Makivic |
| 6,078,893 | A | 6/2000 | Ouimet et al. |
| 6,078,901 | A | 6/2000 | Ching |
| 6,157,918 | A | 12/2000 | Shepherd |
| 6,205,431 | B1 | 3/2001 | Willemain et al. |
| 6,321,205 | B1 | 11/2001 | Eder |
| 6,321,212 | B1 | 11/2001 | Lange |
| 6,381,586 | B1 | 4/2002 | Glasserman et al. |
| 6,393,406 | B1 | 5/2002 | Eder |
| 6,629,082 | B1 | 9/2003 | Hambrecht et al. |
| 6,810,332 | B2 | 10/2004 | Harrison |
| 6,853,952 | B2 | 2/2005 | Chadwick |
| 6,862,579 | B2 | 3/2005 | Mathews et al. |
| 6,910,017 | B1 | 6/2005 | Woo et al. |
| 6,963,854 | B1 | 11/2005 | Boyd et al. |

(Continued)

FOREIGN PATENT DOCUMENTS

EP 1 178 416 A1 2/2002

(Continued)

OTHER PUBLICATIONS

Breeden et al., "Prices of State Contingent Claims Implicit in Options Prices", *Journal of Business*, vol. 51, No. 4, pp. 621-651 (Oct. 1978).

(Continued)

*Primary Examiner* — Romain Jeanty
(74) *Attorney, Agent, or Firm* — Alston & Bird LLP

(57) ABSTRACT

Systems, methods and computer program products for determining a learning curve value and modeling an associated profitability of a good are provided. According to one method of determining a learning curve value, recurring costs of producing each unit of the good are modeled as a function of potential learning curve values. Nonrecurring costs of producing each unit of the good are then modeled as a function of potential learning curve values. Next, the learning curve value is determined based upon the recurring costs model and the nonrecurring costs value such that the sum of the recurring costs and nonrecurring costs at the determined learning curve value is minimized over the potential learning curve values.

32 Claims, 18 Drawing Sheets

U.S. PATENT DOCUMENTS

| | | | |
|---|---|---|---|
| 7,085,734 | B2 | 8/2006 | Grant et al. |
| 7,110,956 | B1 | 9/2006 | Drake et al. |
| 7,133,848 | B2 | 11/2006 | Phillips et al. |
| 7,171,391 | B2 | 1/2007 | Aday et al. |
| 7,197,474 | B1 | 3/2007 | Kitts |
| 7,315,842 | B1 | 1/2008 | Wang |
| 7,349,878 | B1 | 3/2008 | Makivic |
| 7,398,221 | B1 | 7/2008 | Bensoussan et al. |
| 7,574,394 | B2 | 8/2009 | Chorna et al. |
| 2001/0041996 | A1 | 11/2001 | Eder |
| 2002/0010667 | A1 | 1/2002 | Kant et al. |
| 2002/0116348 | A1 | 8/2002 | Phillips et al. |
| 2002/0143604 | A1 | 10/2002 | Cox et al. |
| 2003/0014337 | A1 | 1/2003 | Mathews et al. |
| 2003/0033191 | A1 | 2/2003 | Davies et al. |
| 2003/0078870 | A1 | 4/2003 | Datar et al. |
| 2003/0115128 | A1 | 6/2003 | Lange et al. |
| 2003/0144897 | A1 | 7/2003 | Burruss et al. |
| 2003/0236738 | A1 | 12/2003 | Lange et al. |
| 2004/0068455 | A1 | 4/2004 | Jacobus et al. |
| 2004/0098327 | A1 | 5/2004 | Seaman |
| 2004/0128221 | A1 | 7/2004 | Pandher |
| 2004/0249642 | A1 | 12/2004 | Mathews et al. |
| 2005/0102213 | A1 | 5/2005 | Savasoglu et al. |
| 2005/0125318 | A1 | 6/2005 | Jameson |
| 2006/0253355 | A1 | 11/2006 | Shalen |
| 2007/0011065 | A1 | 1/2007 | Sreenivasan et al. |
| 2007/0016891 | A1 | 1/2007 | Cantor |
| 2007/0022031 | A1 | 1/2007 | Sponholtz et al. |
| 2007/0050282 | A1 | 3/2007 | Chen et al. |
| 2007/0106576 | A1 | 5/2007 | Jung et al. |
| 2007/0112661 | A1 | 5/2007 | Mathews |
| 2007/0150390 | A1 | 6/2007 | Mathews et al. |
| 2007/0150391 | A1 | 6/2007 | Mathews et al. |
| 2007/0150392 | A1 | 6/2007 | Mathews et al. |
| 2007/0150393 | A1 | 6/2007 | Mathews et al. |
| 2007/0150394 | A1 | 6/2007 | Mathews et al. |
| 2007/0150395 | A1 | 6/2007 | Nakamoto et al. |
| 2007/0162376 | A1 | 7/2007 | Mathews et al. |
| 2007/0299753 | A1 | 12/2007 | Averbuch et al. |
| 2007/0299757 | A1 | 12/2007 | Horowitz |
| 2008/0015871 | A1 | 1/2008 | Eder |
| 2008/0109341 | A1 | 5/2008 | Stiff et al. |
| 2008/0133429 | A1 | 6/2008 | Horowitz |
| 2008/0147568 | A1 | 6/2008 | Wang |
| 2008/0167984 | A1 | 7/2008 | Courey et al. |
| 2008/0208678 | A1 | 8/2008 | Walser et al. |
| 2008/0228605 | A1 | 9/2008 | Wang |
| 2008/0288394 | A1 | 11/2008 | Eder |
| 2009/0024543 | A1 | 1/2009 | Horowitz et al. |
| 2009/0030822 | A1 | 1/2009 | Cresswell |
| 2009/0043604 | A1 | 2/2009 | Jung et al. |
| 2009/0043683 | A1 | 2/2009 | Jung et al. |
| 2009/0099955 | A1 | 4/2009 | Peters et al. |
| 2010/0216545 | A1 | 8/2010 | Lange et al. |
| 2011/0081955 | A1 | 4/2011 | Lange et al. |
| 2012/0022995 | A1 | 1/2012 | Lange |

FOREIGN PATENT DOCUMENTS

| | | | |
|---|---|---|---|
| JP | | 2001357189 | 12/2001 |

OTHER PUBLICATIONS

Weston Copeland; *Managerial Finance*; 1990; pp. 481-487, 406-407, 642 (10 pages); 9th Edition; ISBN 0 03 0558832.

Alan Shapiro; *Modern Corporate Finance*; 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems*, 14, 2, ABI/INFORM Global, p. 3.

Eskin, "Dynamic Forecast of New Product Demand Using a Depth of Repeat Model", May 1973, *JMR Journal of Marketing Research*, 10, 0000002, AB/INFORM Global, p. 115.

Bassin, "The Logistic Curve—another approach to new product forecasting", Fall 1991, *The Journal of Business Forecasting Methods & Systems*, 10, 3, ABI/INFORM Global, p. 14.

Paszko et al., "Product Life Cycles and Profitability", Summer 1989, *The Journal of Business Forecasting Methods & Systems*, 8, 2; ABI/INFORM Global, p. 26.

Nelson, "The Product Life Cycle of Engineered Metals: a comparative analysis of the application of product life cycle theory", Spring 1992, *The Journal of Business & Industrial Marketing*, 7, 2, ABI/INFORM Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, 44th AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, 1st Industry / Academy Symposium on Research for Future Supersonic and Hypersonic Vehicles, Greensboro, NC pp. 1-6.

Schrage, "Technology for Rotocraft Affordability Through Integrated Product/Process Development (IPPD)", 1999, American Helicopter Society 55th Annual Forum, Montreal, Canada, pp. 1-19.

Largent, "A probabilistic risk management based process for planning and management of technology development", PhD Dissertation Georgia Tech Aerospace Engineering, Mar. 2003, downloaded Sep. 3, 2008 [retrieved from http://smartech.gatech.edu/handle/1853/12168] pp. 1-79, 210-271.

Eric L. Burgess, Hany S. Gobrieal; *Integrating Spacecraft Design and Cost Risk Analysis Using NASA Technology Readiness Levels*; Feb. 1996; 29th Annual DoD Cost Analysis Symposium, Leesburg, Virginia; 14 pages; The Aerospace Corporation; Herndon, Virginia.

Ray Nelson; Risk Analysis Using @RISK® and Crystal Ball®; *Oracle of IIF* Dec. 2000; pp. 8-11.

*Risk Analysis Overview—What is Risk?*; Available at <http://www.decisioneering.com/risk-analysis-print.html> (visited Feb. 19, 2002).

*Real Options with Monte Carlo Stimulation*; Available at <http://www.puc-rio.br/marco.ind/monte-carlo.html> (visited Feb. 25, 2002).

*Cone of Uncertainty*; Available at <http://www.real-options.com/cou.html> (visited Oct. 11, 2002).

International Search Report dated Nov. 19, 2008, for International Application No. PCT/US04/17258.

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

Macmillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

Longstaff, et al., "Valuing American Options by Simulation: A Simple Least-Squares Approach", Anderson Graduate School of Management, eSchlolarship Repository, University of California, http://repositories.cdlib.org/anderson/fin/1-01, 2001.

Berry, et al., "Automobile Prices in Market Equilibria", Econometrica, vol. 63 No. 4, Jul. 1995, pp. 841-890.

Kent B. Monroe, "Models for Pricing Decisions", Journal of Marketing Research, vol. XV, Aug. 1978, pp. 413-428.

Urban, et al., "A New Product Analysis and Decision Model", Management Science, vol. 14 No. 8, Apr. 1968, pp. B490-B519.

Yang, et al. "Bayesian Analysis of Simultaneous Demand and Supply", Quantitative Marketing and Economics, vol. 1, 2003, pp. 251-275.

Kamath, et al., "A Bayesian Approach to a Dynamic Inventory Model Under an Unknown Demand Distribution", Computers & Operations Research, vol. 29, 2002, pp. 403-422.

Hirschleifer, "Price Theory and Applications", Prentice-Hall, New York, 1980, pp. 126-151 (31 pages total).

Morris, "Market Oriented Pricing", Quaron Books, New York, 1992, pp. 172-173 (7 pages total).

Evans, et al., "Marketing", Chapter 18: Overview of Price Planning, MacMillan, New York, 1992, pp. 526-547 (25 pages total)

SYSTEMS, METHODS AND COMPUTER PROGRAM PRODUCTS FOR MODELING COSTS AND PROFITABILITY OF A GOOD

CROSS-REFERENCE TO RELATED APPLICATIONS

This application is a continuation of U.S. patent application Ser. No. 10/453,727, entitled: Systems, Methods and Computer Program Products for Modeling Demand, Supply and Associated Profitability of A Good, filed Jun. 3, 2003, now U.S. Pat. No. 7,627,495, which is hereby incorporated herein in its entirety by reference.

FIELD OF THE INVENTION

The present invention relates generally to determining a learning curve value of a good and, more particularly, to systems, methods and computer program products for determining a learning curve value and modeling associated profitability and costs of a good.

BACKGROUND OF THE INVENTION

In many manufacturing industries today, companies analyze many questions during the creation of a manufactured good. Among such questions, companies analyze how much money should be put into research and development, whether it is best to have a steep learning curve or a shallow learning curve, what is the trade off between recurring costs and non-recurring costs, should money be spent in lowering the cost of the first unit manufactured (referred to as T#1 cost), how much should be invested in automation, and what are the optimum profits. Currently, there are no techniques to adequately answer such questions. Typically, it is left to upper management to gather data and make a judgment call on what it feels is the correct solution. In this regard, for many older companies, a lot of historical data exists that can aid in validating most of the decisions.

Of all the questions listed above, the question of what are the optimum profits is the driving force in business. Every company would like to maximize their profits. In this regard, profits are a balance between costs and revenue. Costs can be divided into two different types, nonrecurring and recurring. Nonrecurring costs are those that are one-time investments that help to start a manufacturing line. They include the costs of building factories, creating specialized tools (automation), research and development, etc. Recurring costs are those that continually (usually annually) need to be invested in to keep a manufacturing line open. They include the costs of materials, building maintenance, worker's salary, etc. The sum of both nonrecurring and recurring costs are typically referred to as the total cost of a program.

In manufacturing and many other fields, recurring costs are usually linked to a learning curve. The learning curve describes the level of improvement over time. Typically, the learning curve is used to describe the behavior of people who do a job. When trying to build a manufactured good for the first time, people will do a job at a given rate. As the same people continue to do the same job, the quality of their work gets better and they can do it at a faster rate. This improvement typically continues as more units are produced. The learning curve, then, is a way to capture this improvement and factor it into the recurring costs. In this regard, recurring costs per unit goes down as more units are produced. So a learning curve is only relevant when people are integral to a manufacturing line. In the case of a fully automated line, then, the learning curve is flat because there is no improvement over time.

Although it is known that recurring costs drop as time goes on, the level that recurring costs begins at is not generally known. However, there is a relationship between the nonrecurring costs and the initial level of the recurring costs. To understand why this relationship holds, consider the following simplified example.

As stated before, costs for specialized tools fall under nonrecurring costs. It is with these tools that people will build a unit of the good. People will be able to do their job faster if they have specialized tools to do the job. They may still be able do the job with less specialized tools, but it may take longer. The longer it takes, then, the more it costs to produce the first unit. It is the cost of the first unit that sets the initial level of the recurring costs. On the other hand, specialized tools cost money and, therefore, affect the nonrecurring costs. In this regard, a rough inverse relationship can be drawn from the cost of the first unit (recurring costs) and the nonrecurring costs. In general, as nonrecurring costs go up, the cost of the first unit goes down.

Since nonrecurring costs and recurring costs are related, it is desirable to find the balance between the two that will optimize profits and, thus, answer the question that is the driving force in business. It must be kept in mind, though, that recurring costs change depending on the learning curve used.

SUMMARY OF THE INVENTION

In light of the foregoing background, embodiments of the present invention provide systems, methods and computer program products for determining a learning curve value, and modeling associated profitability and costs of a good. The systems, methods and computer program products of the present invention advantageously are capable of modeling the cost of producing the good, including the recurring and non-recurring costs, while accounting for uncertainty in such costs. Thereafter, the systems, methods and computer program products are capable of determining a learning curve value to thereby maximize profitability. Additionally, the systems, methods and computer program products of embodiments of the present invention are capable of modeling the demand and associated profitability while better accounting for an uncertain market that can be represented by variability in the relationship of the price of the good and the number of units of the good purchased, as well as the variability in the relationship of the cost of producing the good and an associated learning curve value. By accounting for such uncertainty, the systems, methods and computer program products of embodiments of the present invention can better model the profitability to thereby maximize such profitability.

According to one aspect of the present invention, a method is provided that includes determining the learning curve value based upon a model of profitability as a function of potential learning curve values, where the learning curve value is determined such that the profitability is maximized over the potential learning curve values. As the learning curve value is determined based upon a profitability model, the method can also include modeling the profitability before determining the learning curve value mode. In such instances, profitability can be modeled by also modeling recurring costs to produce the good. Recurring costs, then, can be modeled by determining a T#1 cost for each of a plurality of potential learning curve values based upon a model of T#1 cost as a function of potential learning curve values. Thereafter, recurring costs can be modeled based upon the T#1 cost and a learning curve for each of the potential learning curve values.

Before determining the T#1 cost, T#1 cost can be modeled as a function of potential learning curve values. In this regard, T#1 cost can be modeled by selecting a unit cost to produce the good, and thereafter determining a fixed cost to produce a first unit of the good based upon the unit cost. Then, a variance factor can be determined as a function of potential learning curve values based upon a variance and a benchmark learning curve value. After determining the variance factor, T#1 cost can be modeled as a function of potential learning curve values based upon the variance factor and the fixed cost.

In instances in which the method includes modeling the profitability before determining the learning curve value, the profitability can be modeled by further modeling a nonrecurring costs to produce the good. More particularly, nonrecurring costs can be modeled by determining a relationship between nonrecurring costs and potential learning curve values. Then, an uncertainty value can be selected from a risk distribution associated with nonrecurring costs. Thereafter, nonrecurring costs can be modeled based upon the relationship between nonrecurring costs and potential learning curve values, and the uncertainty value.

In embodiments where profitability is modeled before determining a learning curve value, the profitability can be modeled for each of a plurality of potential learning curve values. Also, in such embodiments, the method can further include forecasting a market by randomly selecting a predefined number of units of a good based upon a market potential distribution. As such, the profitability can be modeled for each of the plurality of potential learning curve values based upon the forecasted market. The method can include repeatedly forecasting different markets, with profitability being modeled for the plurality of potential learning curve values for each of the forecasted markets. Then, a learning curve value can be determined by identifying a learning curve value for each forecasted market such that the profitability is maximized over the potential learning curve values, and thereafter determining a learning curve value such that the mean profitability at each identified learning curve value is maximized over the identified learning curve values.

According to another aspect of the present invention, a method is provided that includes determining a T#1 cost for a selected potential learning curve value, and thereafter modeling recurring cost to produce a good, in a manner such as described above. The method can also include modeling T#1 cost, such as in a manner described above. In modeling T#1 cost, the method can determine variance by also establishing a plurality of variance values associated with different learning curve values, and thereafter fitting a curve to define a relationship between the plurality of variance values and associated learning curve values. Also in modeling T#1 cost, the method can include repeatedly selecting different unit costs. Thereafter, the method can include modeling the recurring costs for each selected unit cost.

The method according to this aspect can further include forecasting a market by randomly selecting a predefined number of units of a good based upon a market potential distribution. Recurring costs can then be modeled further based upon the forecasted market. In some instances, such as those in which the good is purchased in a differentiated market, the forecasted market can include a predefined number of contracts each having a predetermined number of units and a predetermined price per unit. In those instances, recurring costs can be modeled further based upon the predefined number of contracts. In addition to forecasting a market, the method can include modeling profitability of the good in the forecasted market based upon the recurring costs model and a demand model. In some instances, profitability can be modeled further based upon a nonrecurring costs model. By repeatedly forecasting different markets, recurring costs and profitability can be modeled for each of the forecasted markets. Subsequently, recurring costs and profitability can be modeled for a plurality of potential learning curve values for each forecasted market. As such, a learning curve value can be determined by identifying a learning curve value for each forecasted market such that the profitability is maximized over the potential learning curve values, and thereafter determining a learning curve value such that the mean profitability at each identified learning curve value is maximized over the identified learning curve values.

According to yet another aspect of the present invention, a method is provided that includes modeling nonrecurring costs. More particularly, the method includes determining a relationship between nonrecurring costs and potential learning curve values. For example, the relationship can be determined by establishing a plurality of nonrecurring costs values associated with different learning curve values, and thereafter fitting a curve to define the relationship between nonrecurring costs values and potential learning curve values. After determining a relationship between nonrecurring costs and potential learning curve values, an uncertainty value can be selected from a risk distribution associated with nonrecurring costs. Nonrecurring costs to produce a good are then modeled based upon the relationship between nonrecurring costs and potential learning curve values, and the uncertainty value. In one embodiment, for example, the method includes repeatedly selecting different uncertainty values. In this embodiment, the nonrecurring costs can be modeled for each selected uncertainty value.

The method according to this aspect of the present invention can also include modeling profitability of the good based upon the nonrecurring costs model, recurring costs model and a demand model. In such instances, the method can forecast a market, and thereafter model profitability further based upon the forecasted market. Further, the method can include repeatedly forecasting different markets. As such, the profitability can be modeled for each of the forecasted markets. The method can additionally include modeling profitability for a plurality of potential learning curve values for each forecasted market. As such, a learning curve value can be determined, such as in a manner described above.

Advantageously, according to various embodiments of the present invention, the determined learning curve value, recurring costs model, nonrecurring costs model and/or profitability are capable of being modeled with a processing element operating a spreadsheet software program. In such embodiments, the determined learning curve value, recurring costs model, nonrecurring costs model and/or profitability can be presented on a display coupled to the processing element. More particularly, the determined learning curve value can be displayed by presenting a display of the recurring costs model and the nonrecurring costs model as functions of potential learning curve values such that the determined learning curve value is presented as the potential learning curve value that minimizes the sum of the recurring costs and nonrecurring costs. The recurring costs and nonrecurring costs models can be presented in a number of manners including, for example, as plots of different recurring costs and/or nonrecurring costs with associated potential learning curve values and/or with associated numbers of units of the good in a forecasted market. Similarly, the profitability model can be presented, for example, as a plot of different profitability with associated potential learning curve values and/or with associated numbers of units of the good in a forecasted market.

Embodiments of the present invention therefore provide systems, methods and computer program products for determining a learning curve value and modeling associated profitability and costs of a good. Advantageously, the systems, methods and computer program products of embodiments of the present invention are capable of modeling the demand and associated profitability while better accounting for variability in the relationship of the price of the good and the number of units of the good purchased, as well as the variability in the relationship of the cost of producing the good and an associated learning curve value. As such, embodiments of the present invention can better model the profitability to thereby maximize such profitability.

BRIEF DESCRIPTION OF THE DRAWINGS

Figure 1:
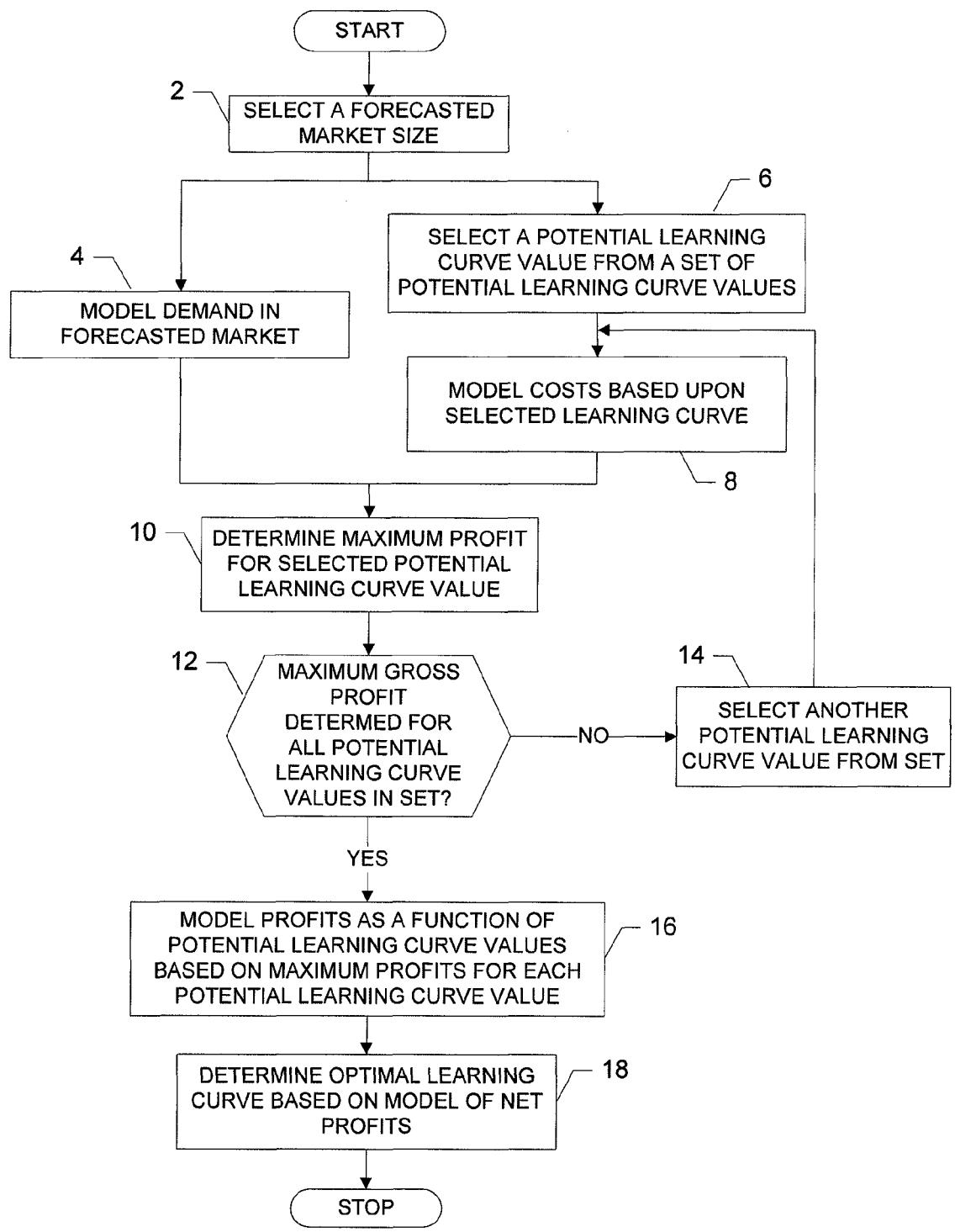
Figure 2:
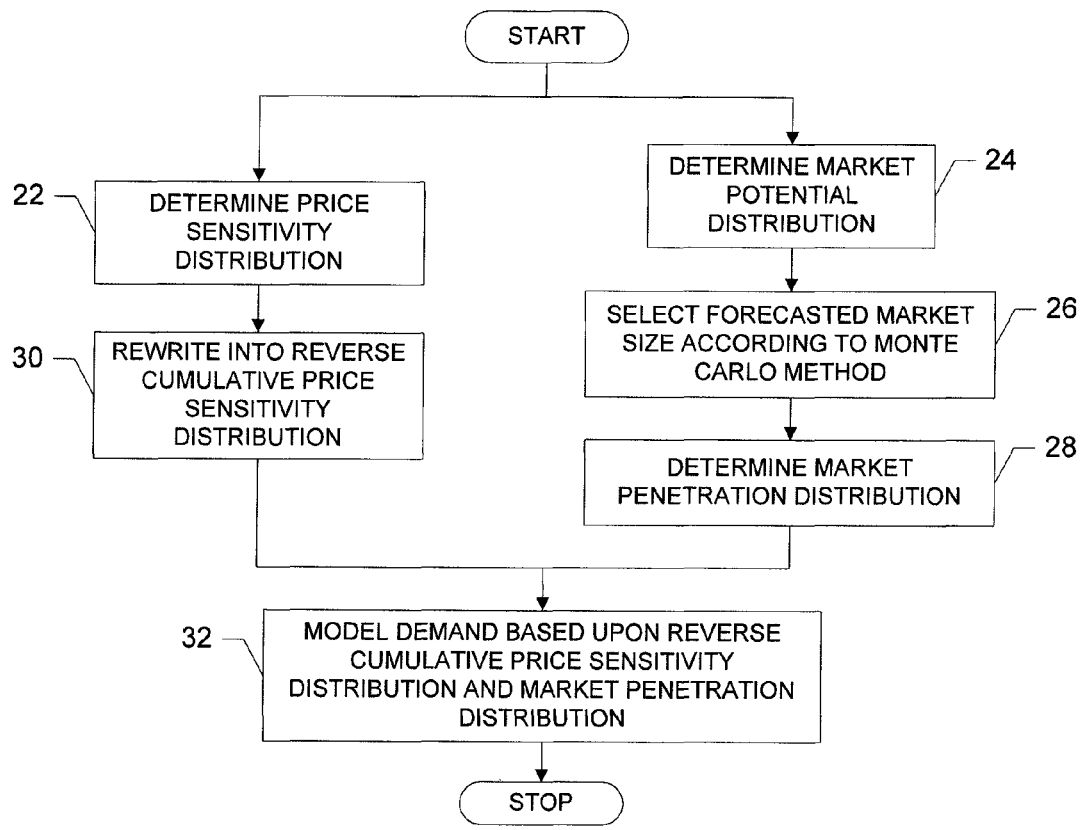
Figure 3:
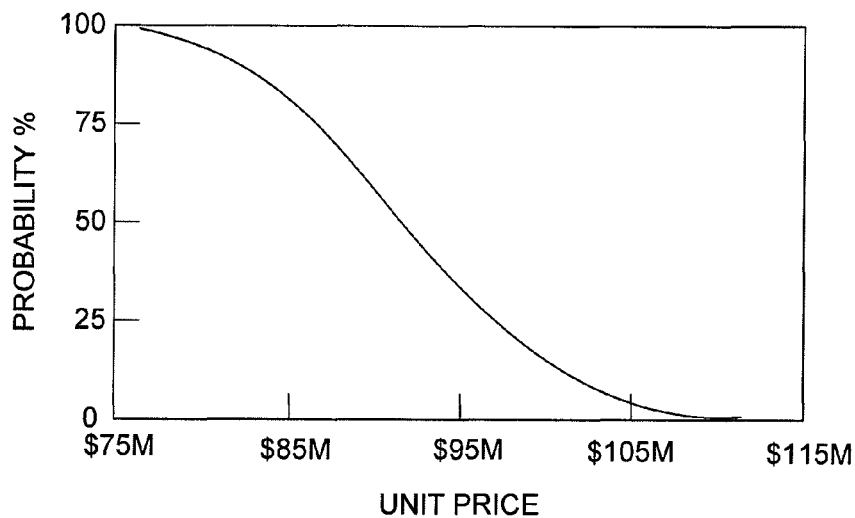
Figure 4:
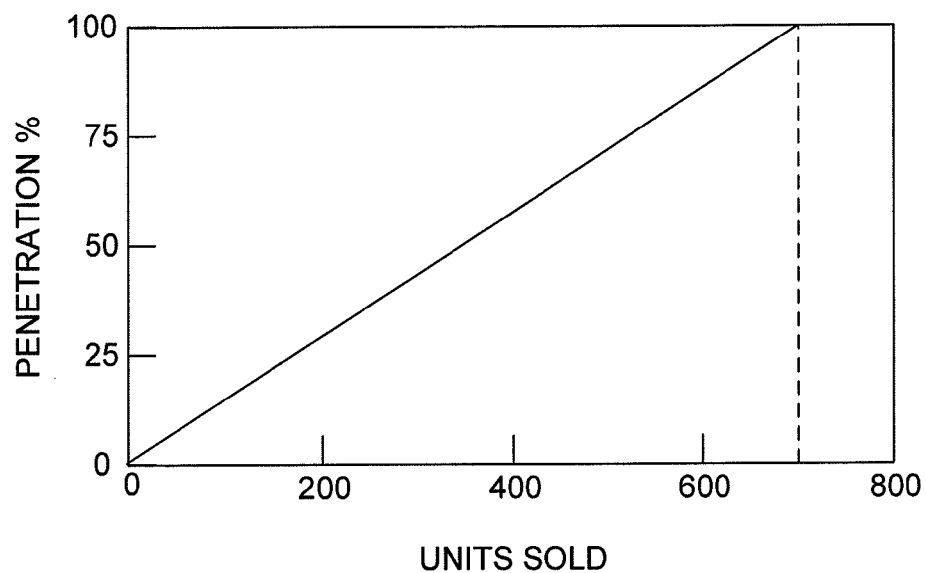
Figure 5:
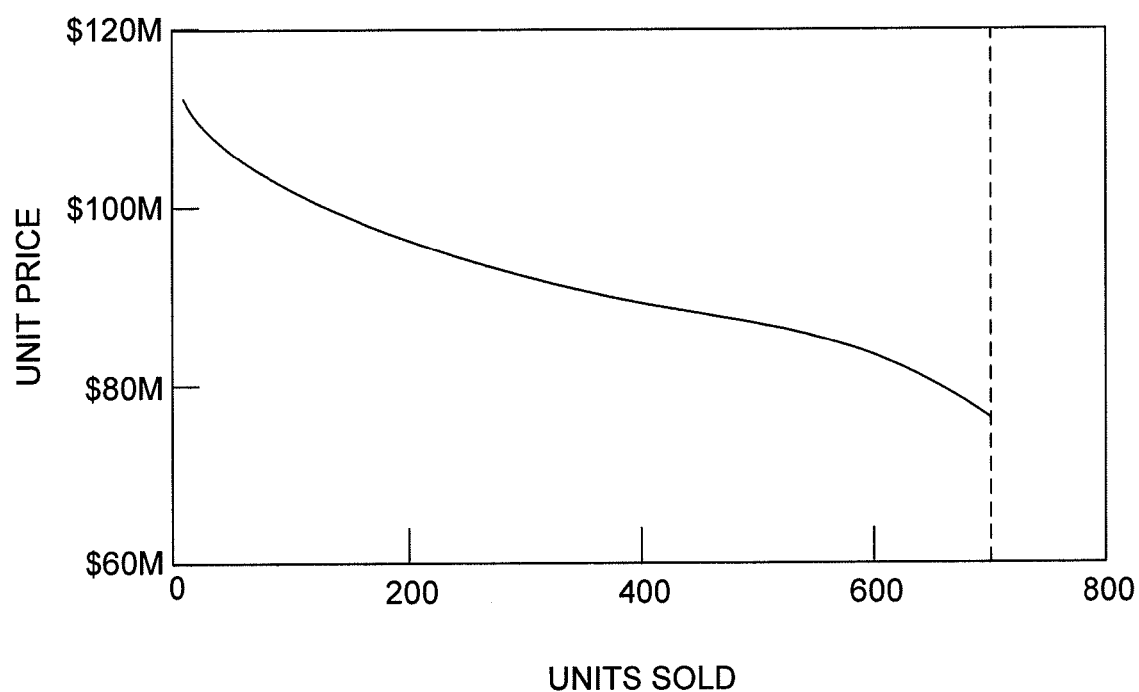
Figure 6:
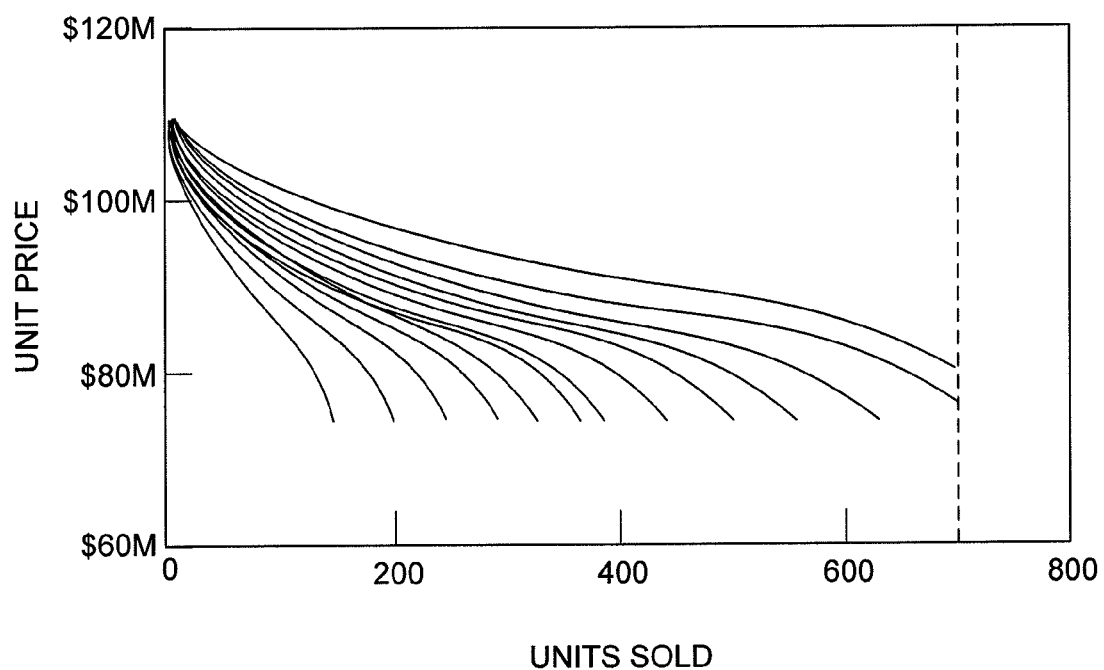
Figure 7:
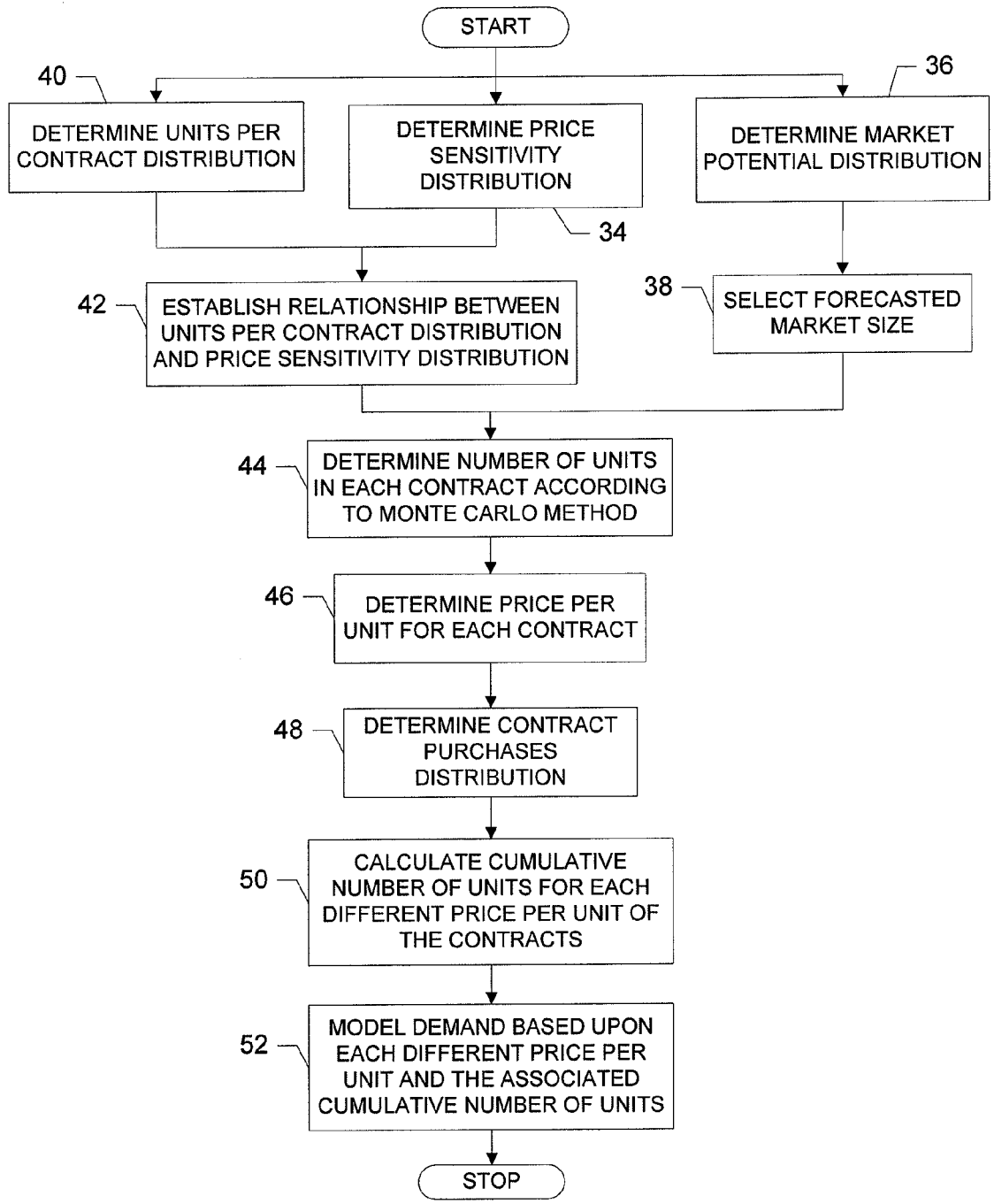
Figure 8:
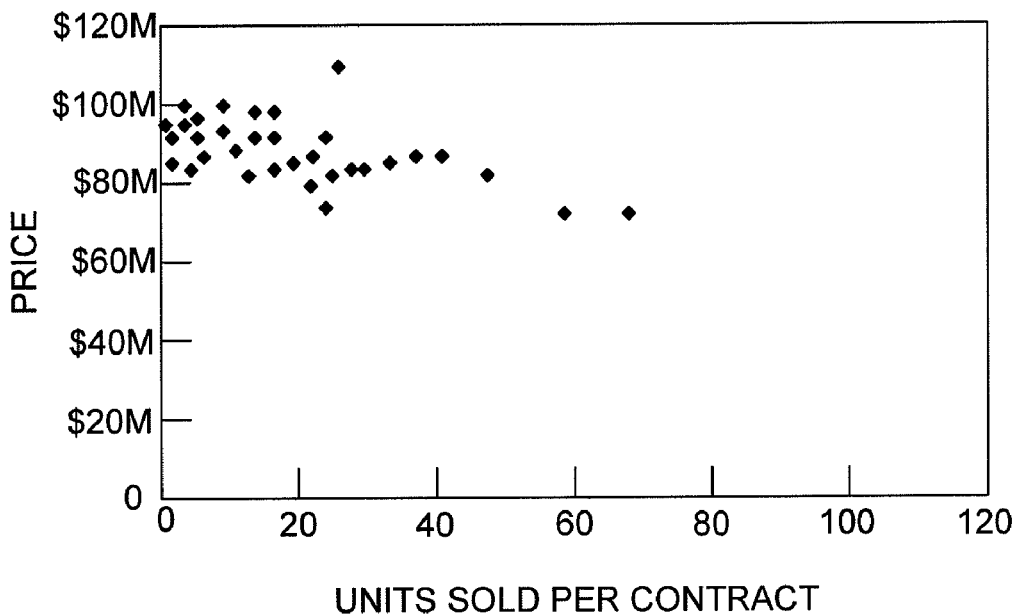
Figure 9:
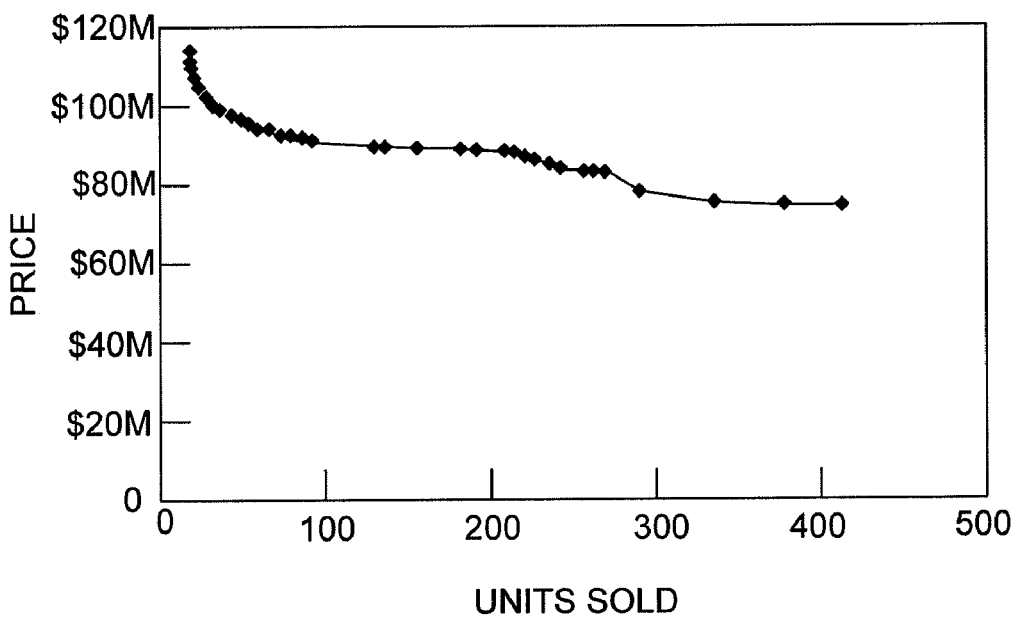
Figure 10A:
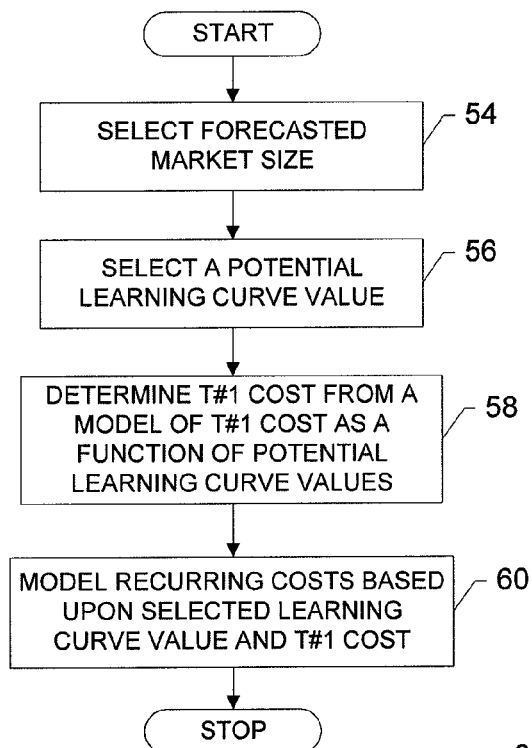
Figure 10B:
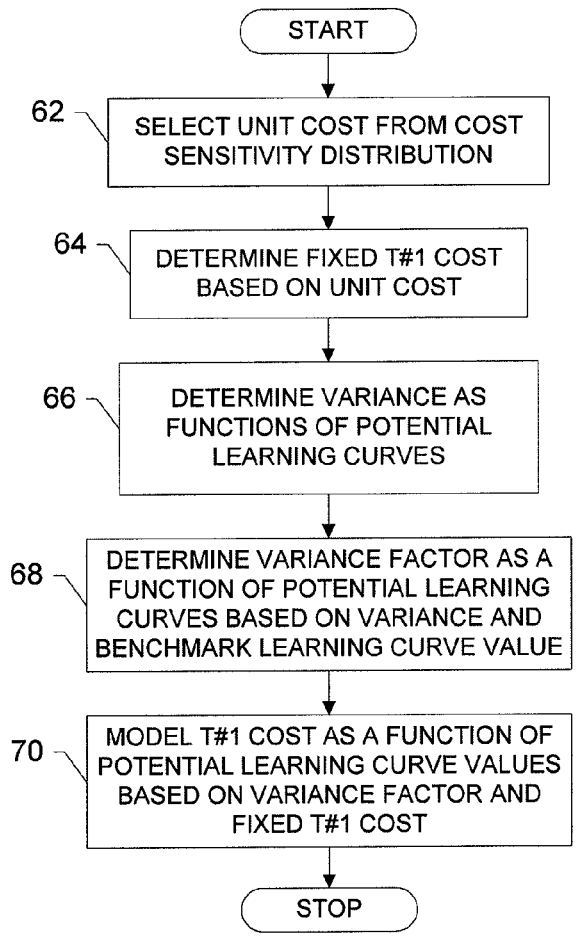
Figure 11:
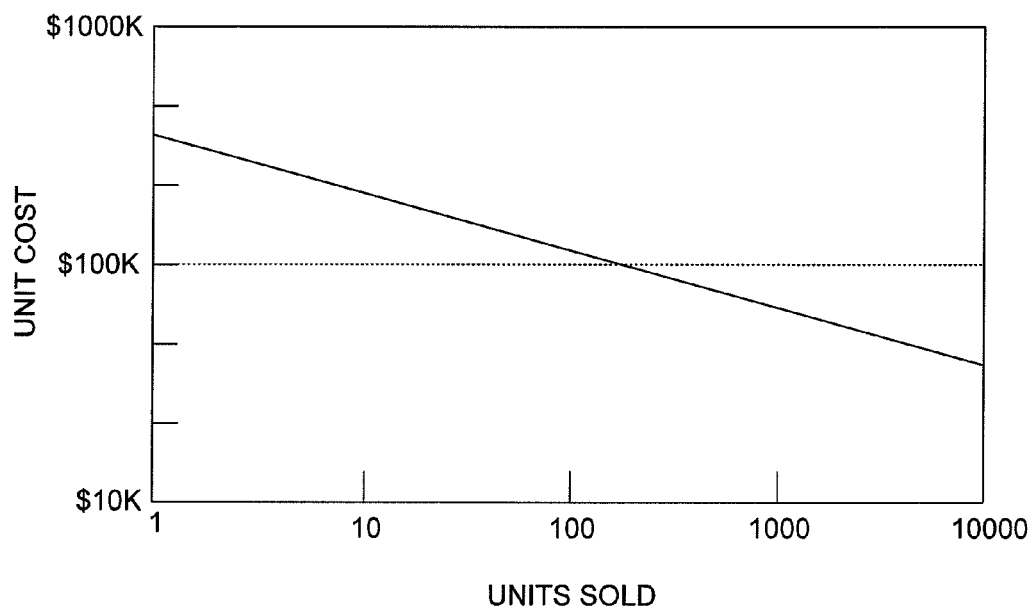
Figure 12:
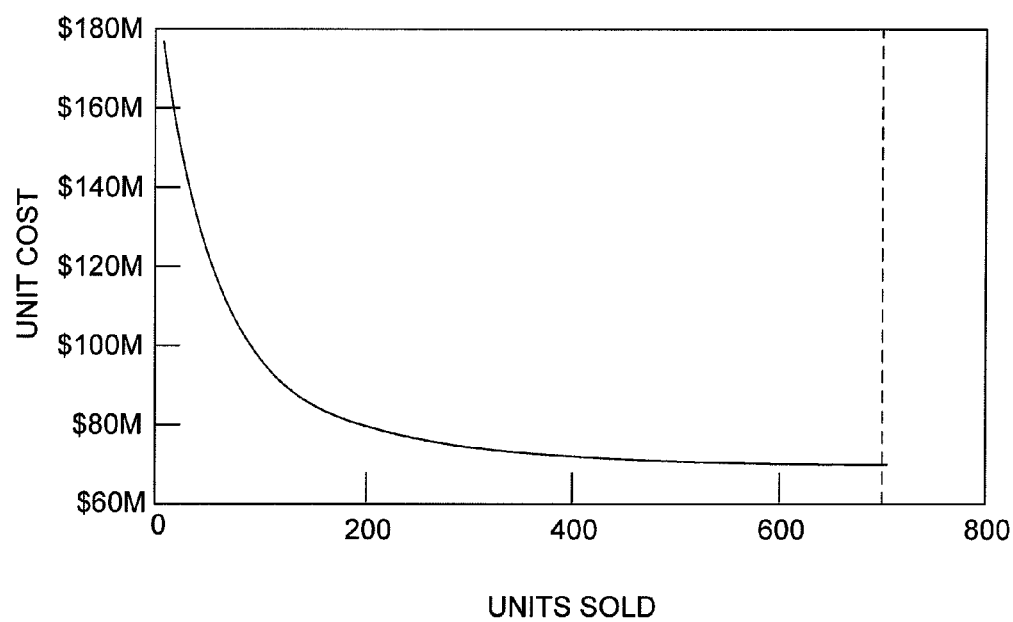
Figure 13:
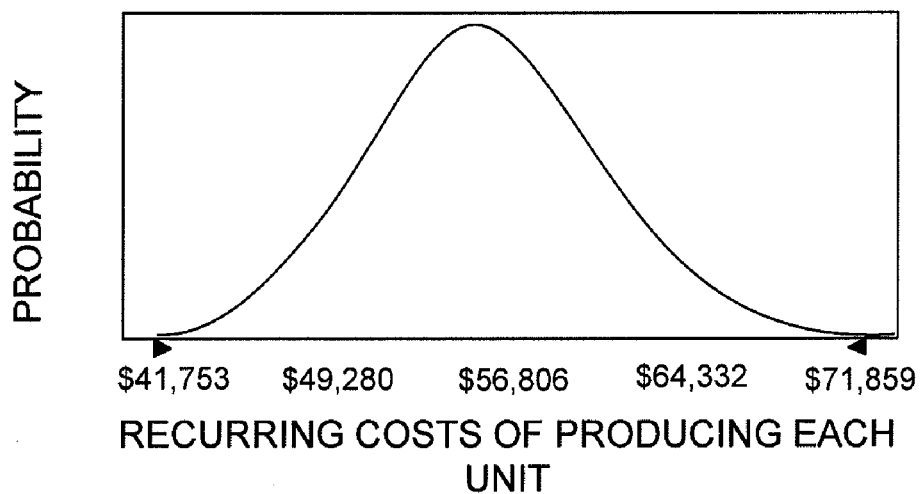
Figure 14A:
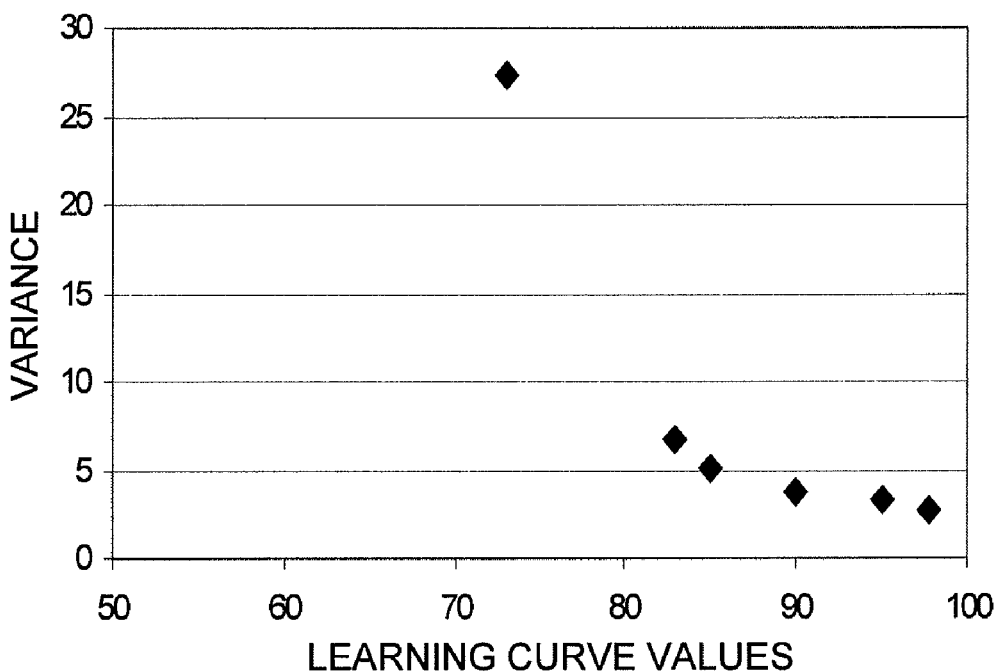
Figure 14B:
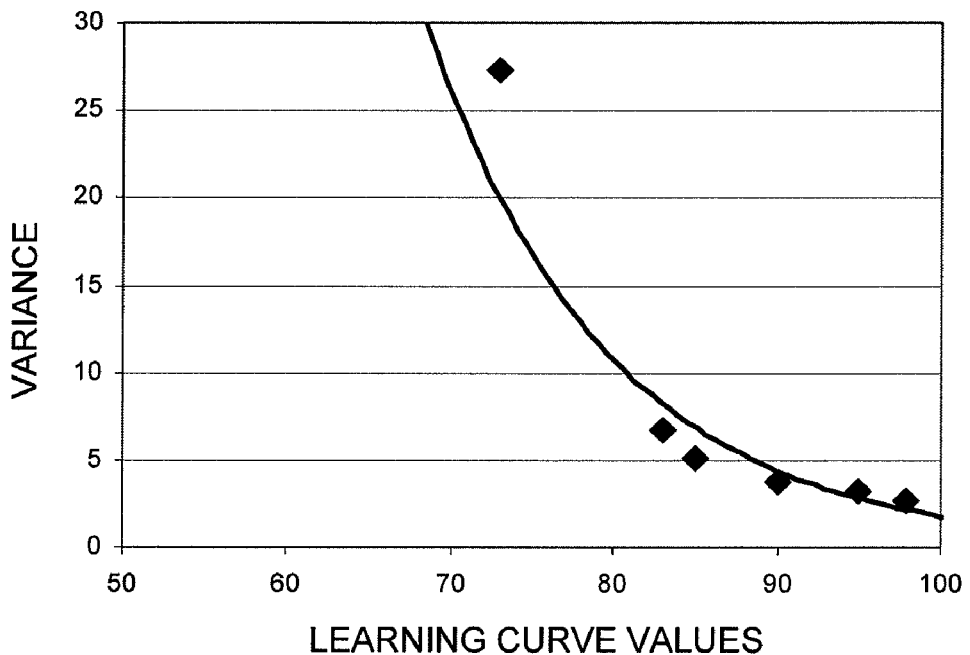
Figure 15:
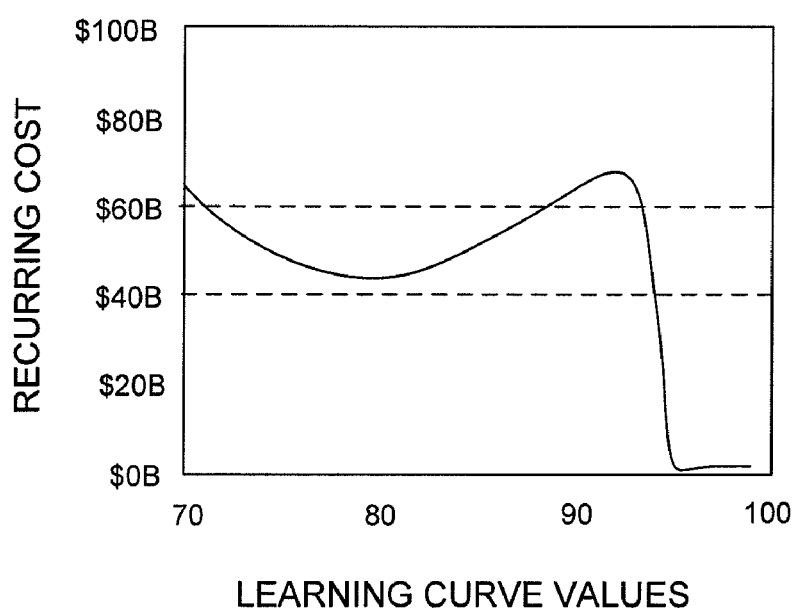
Figure 16:
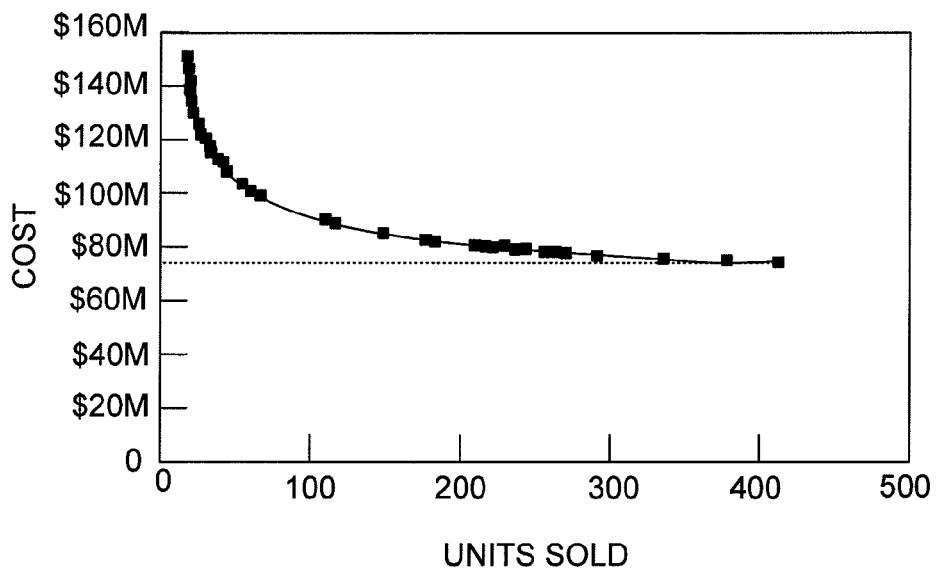
Figure 17A:
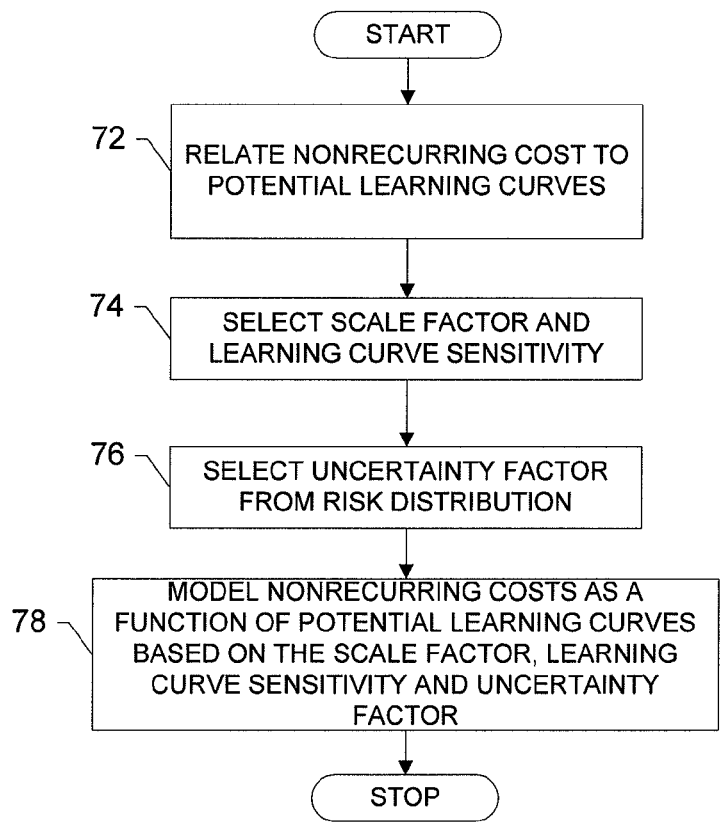
Figure 17B:
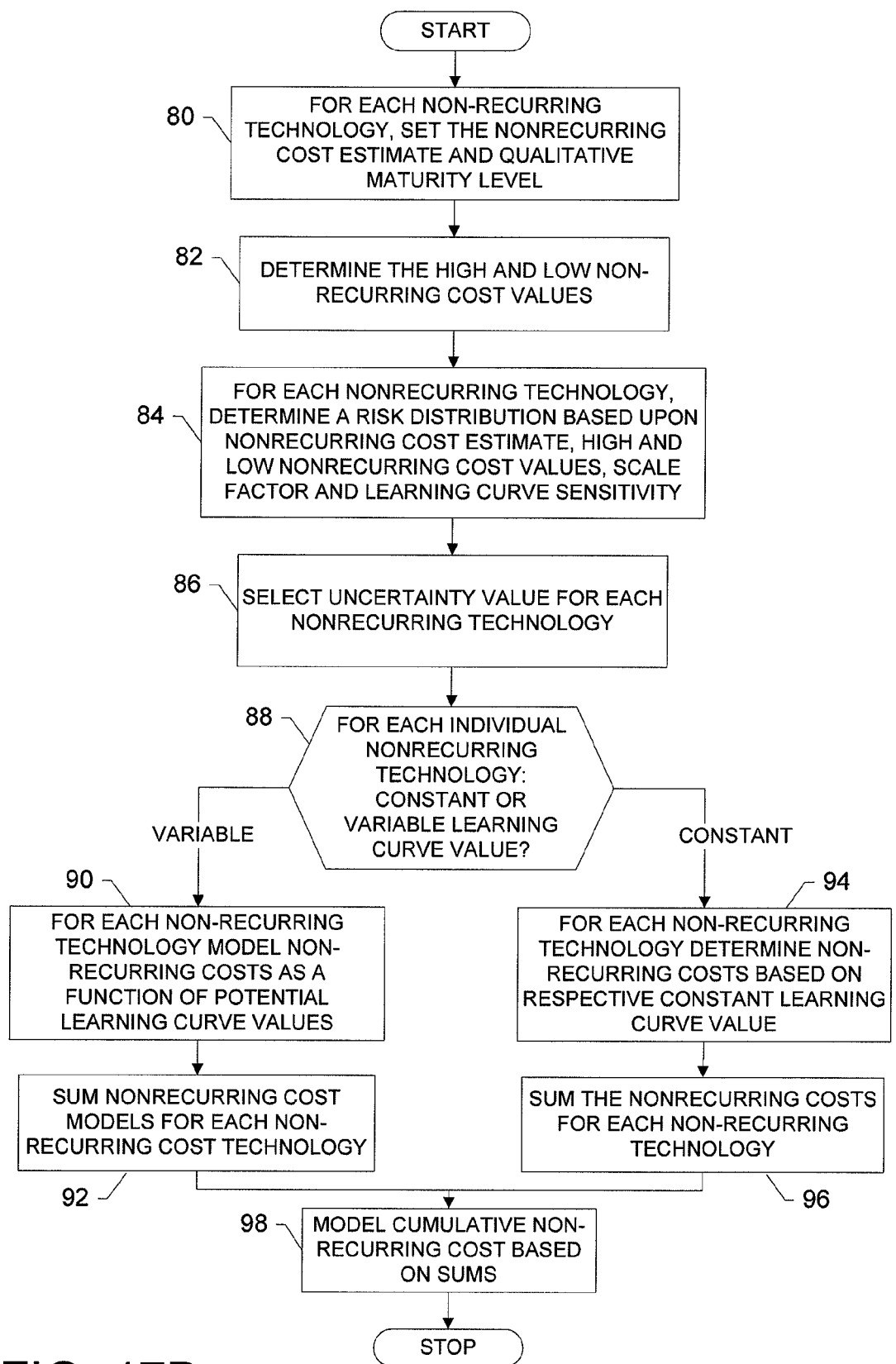
Figure 18A:
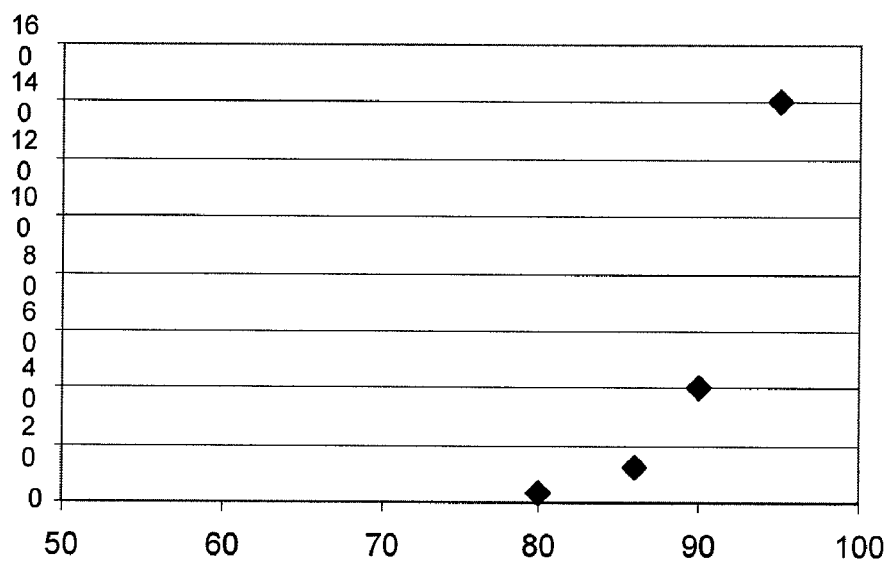
Figure 18B:
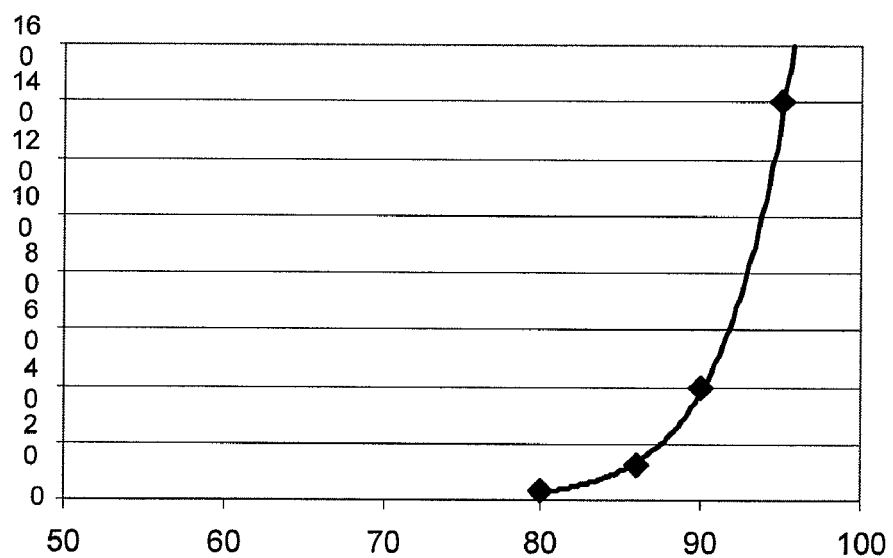
Figure 19:
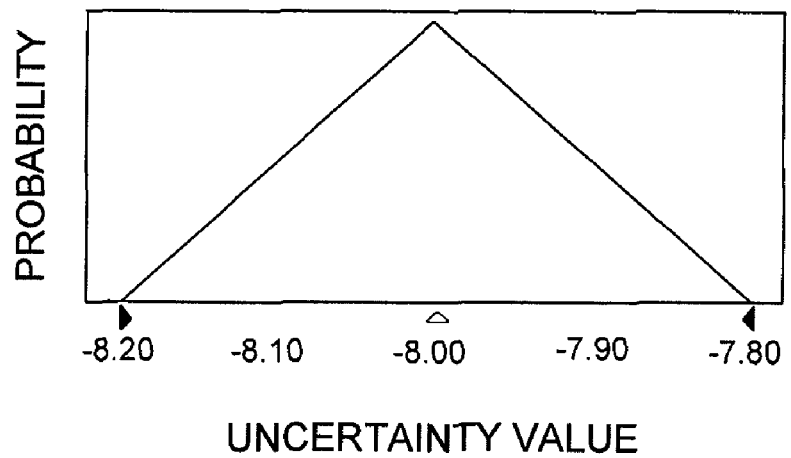
Figure 20:
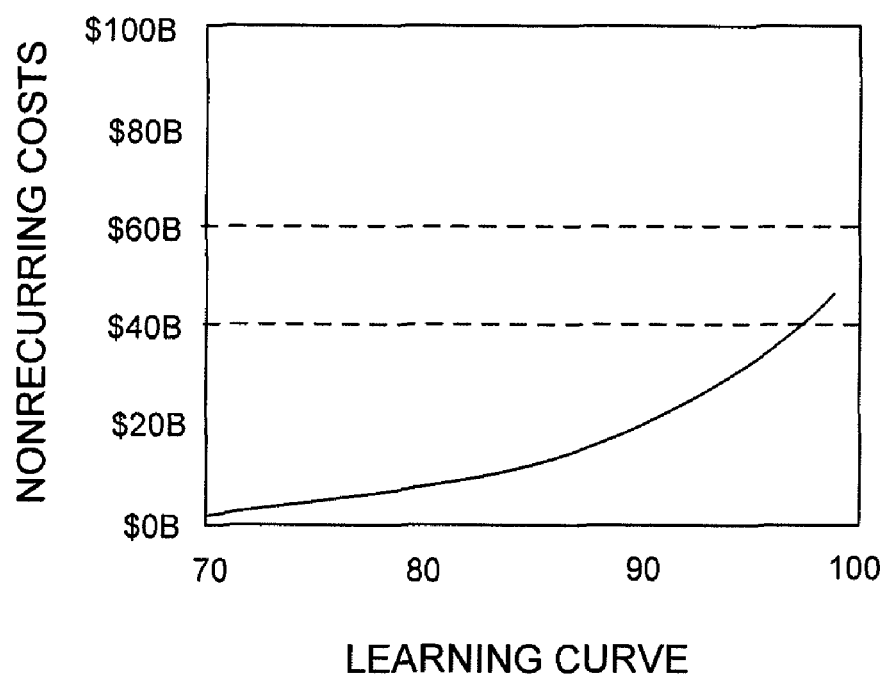
Figure 21:
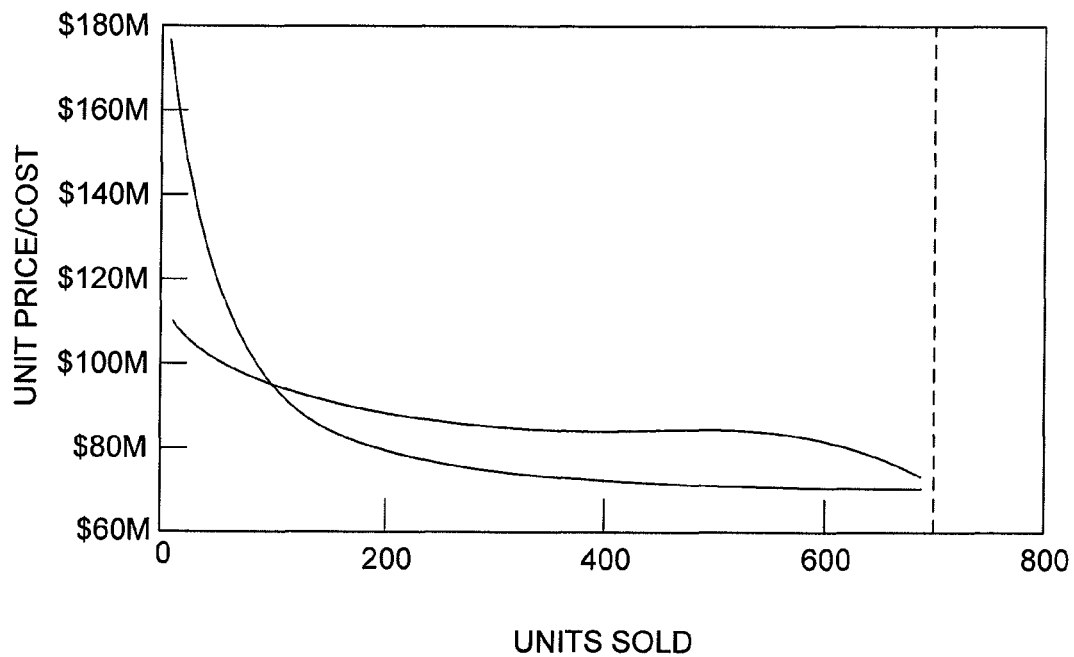
Figure 22:
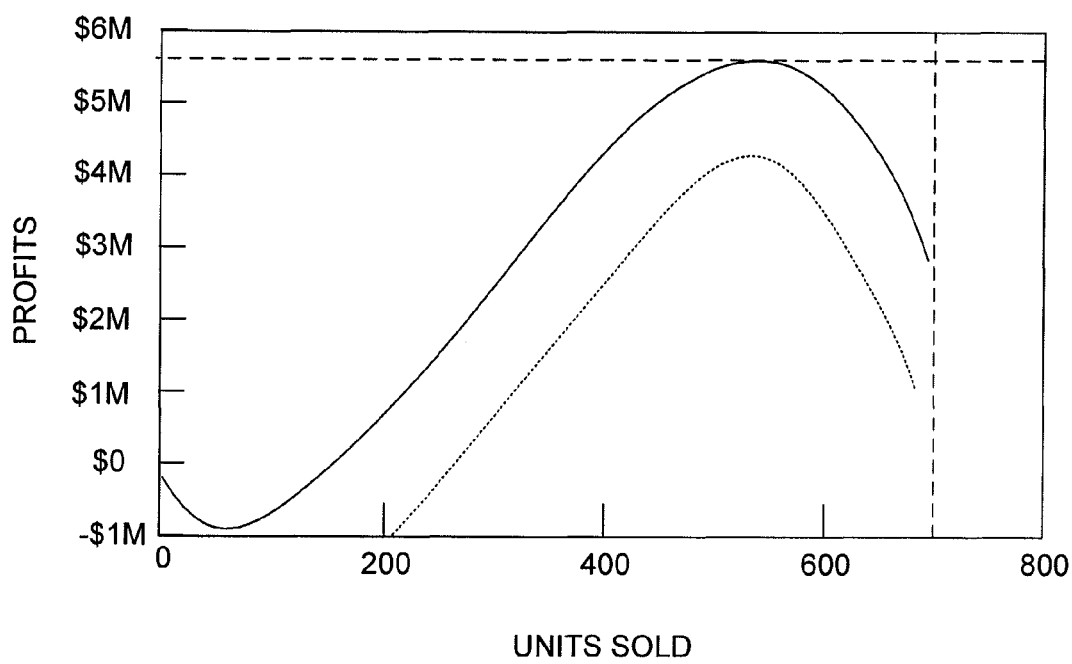
Figure 23:
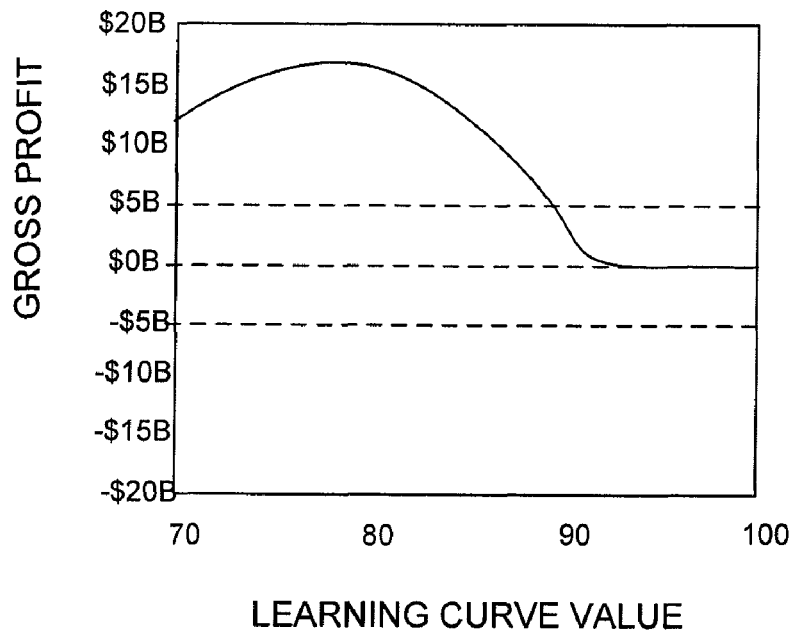
Figure 24:
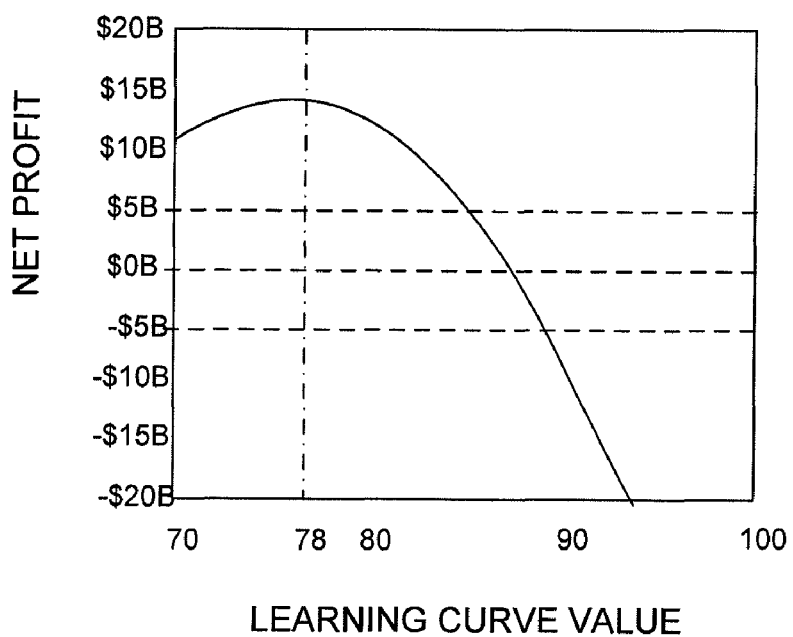
Figure 25A:
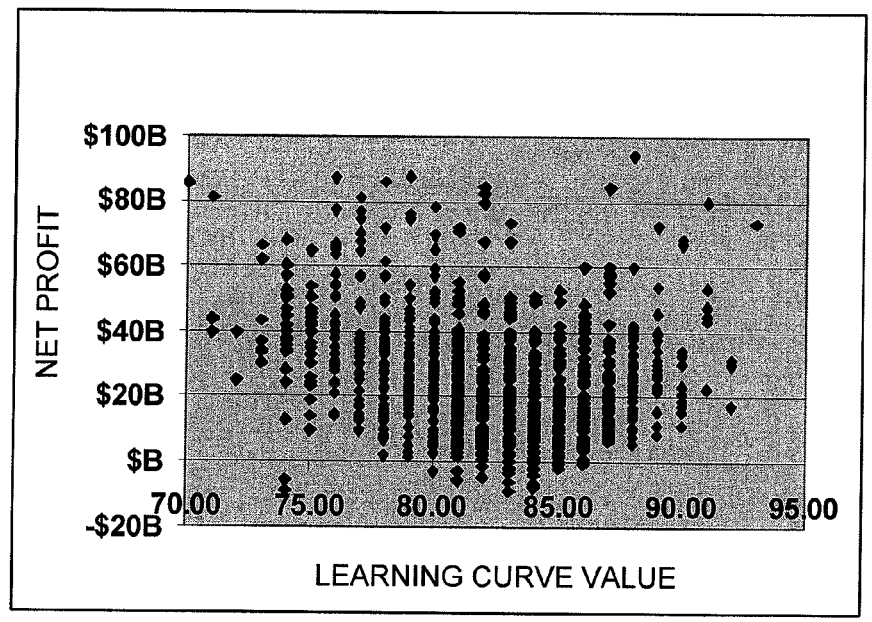
Figure 25B:
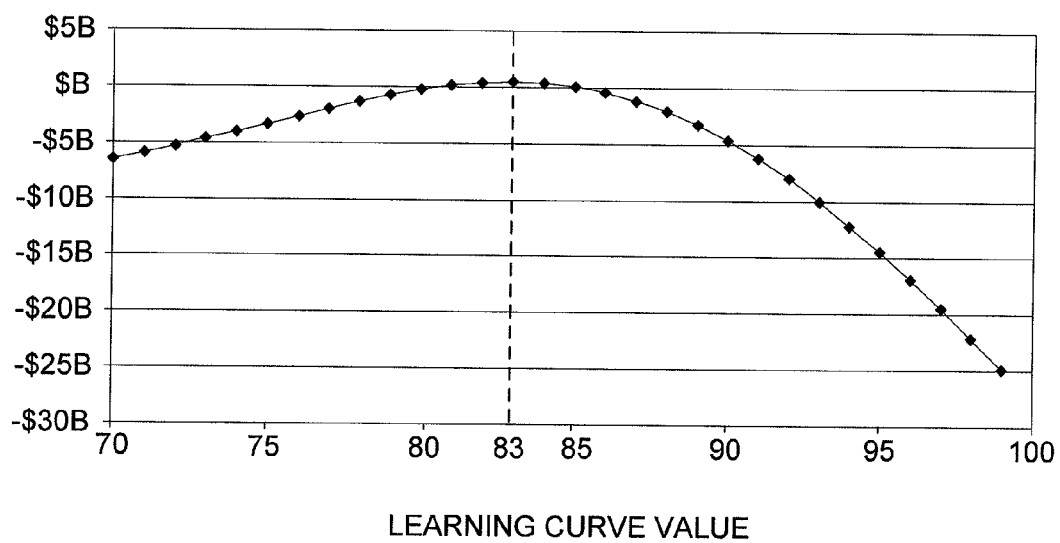
Figure 26:
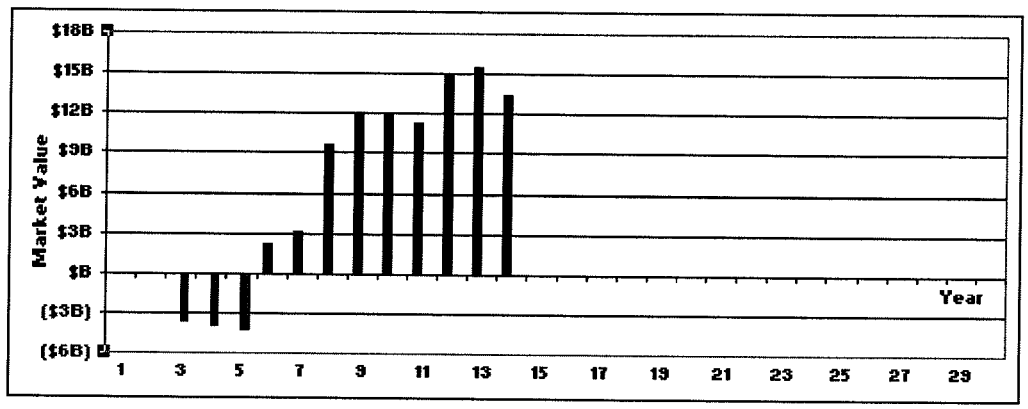
Figure 27:
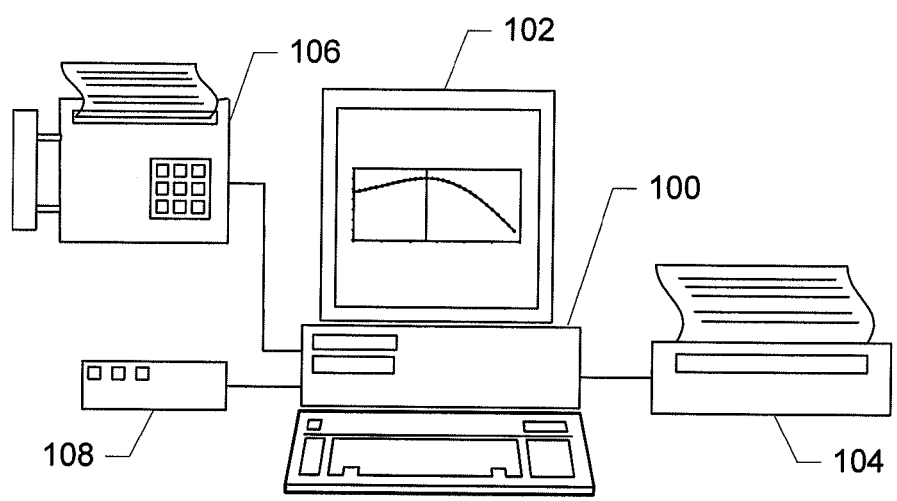

Having thus described the invention in general terms, reference will now be made to the accompanying drawings, which are not necessarily drawn to scale, and wherein:

FIG. 1 is a flowchart including various steps in a system, method and computer program product for determining a learning curve value according to one embodiment of the present invention;

FIG. 2 is a flowchart including various steps in a system, method and computer program product for modeling the demand for a good purchased in a non-differentiated market according to one embodiment of the present invention;

FIG. 3 is a schematic illustration of a price sensitivity distribution recast in reverse cumulative format utilized during operation of the system, method and computer program product of one embodiment of the present invention;

FIG. 4 is a schematic illustration of a market penetration distribution for a forecasted market utilized during operation of the system, method and computer program product of one embodiment of the present invention;

FIG. 5 is a schematic illustration of a demand curve for a forecasted market according to one embodiment of the present invention in the context of a good purchased in a non-differentiated market;

FIG. 6 is a schematic illustration of multiple demand curves for multiple forecasted markets according to one embodiment of the present invention in the context of a good purchased in a non-differentiated market;

FIG. 7 is a flowchart including various steps in a system, method and computer program product for modeling the demand for a good purchased in a differentiated market according to one embodiment of the present invention;

FIG. 8 is a graph illustrating a contract purchases collection utilized during operation of the system, method and computer program product of one embodiment of the present invention;

FIG. 9 is a schematic illustration of a demand curve for a forecasted market according to one embodiment of the present invention in the context of a good purchased in a differentiated market;

FIG. 10A is a flowchart including various steps in a system, method and computer program product for modeling recurring costs of a good according to one embodiment of the present invention;

FIG. 10B is a flowchart including various steps in a system, method and computer program product for modeling the cost of producing the first unit (i.e., T#1 cost) of a good according to one embodiment of the present invention FIG. 11 is a schematic illustration of a learning curve associated with the cost to produce a good utilized during operation of the system, method and computer program product of one aspect of the present invention;

FIG. 12 is a schematic illustration of a recurring cost curve utilized during operation of the system, method and computer program product of one aspect of the present invention in the context of a good purchased in a non-differentiated market;

FIG. 13 is a graph of a cost sensitivity distribution utilized during operation of the system, method and computer program product of one embodiment of the present invention;

FIG. 14A is a graph of variance values and associated learning curve values established from theoretical T#1 variance values associated with different learning curve values, utilized to model recurring costs of a good according to one embodiment of the present invention;

FIG. 14B is a graph of a best fit curve established from the variance values and associated learning curve values from FIG. 14A;

FIG. 15 is a plot of recurring costs as a function of potential learning curve values according to one embodiment of the present invention;

FIG. 16 is a schematic illustration of a recurring cost curve utilized during operation of the system, method and computer program product of one embodiment of the present invention in the context of a good purchased in a differentiated market;

FIG. 17A is a flowchart including various steps in a system, method and computer program product for modeling a non-recurring costs of a good according to one embodiment of the present invention;

FIG. 17B is a flowchart including various steps in a system, method and computer program product for modeling a non-recurring costs of a good according to another embodiment of the present invention;

FIG. 18A is a graph of nonrecurring costs values and associated learning curve values utilized to model nonrecurring costs of a good according to one embodiment of the present invention;

FIG. 18B is a graph of a best fit curve established from the nonrecurring costs values and associated learning curve values from FIG. 18A;

FIG. 19 is a graph of a risk distribution utilized during operation of the system, method and computer program product of one embodiment of the present invention;

FIG. 20 is a plot of nonrecurring costs modeled as a function of potential learning curve values according to one embodiment of the present invention;

FIG. 21 is a schematic illustration comparing the demand curve of FIG. 5 with the cost curve of FIG. 12;

FIG. 22 is a schematic illustration of a gross profitability curve and a net profitability curve according to one embodiment of the present invention;

FIG. 23 is a plot of gross profitability of a good modeled as a function of potential learning curve values according to one embodiment of the present invention in the context of a good in a non-differentiated market;

FIG. 24 is a plot of net profitability of a good modeled as a function of potential learning curve values according to one embodiment of the present invention in the context of a good in a non-differentiated market;

FIG. 25A is a scatter plot illustrating optimum learning curve values against the net profitabilities for the respective learning curve values, determined according to one embodiment of the present invention;

FIG. 25B is a graph illustrating the mean net profitability for each potential learning curve value, determined according to one embodiment of the present invention;

FIG. 26 is a schematic illustration of the market value of a project of selling a good over time determined according to one embodiment of the present invention; and FIG. 27 is a schematic block diagram of the system of one embodiment of the present invention embodied by a computer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A system, method and computer program product according to one aspect of the present invention are provided for determining a learning curve value for the manufacture of a good. More particularly, the system, method and computer program product of this aspect are capable of determining a learning curve value that maximizes profits for the sale of the goods in an uncertain future market. Briefly, referring to FIG. 1, a method of determining a learning curve value generally begins by forecasting a market of a select size, as shown in block 2. After selecting the forecasted market, demand for the good in the forecasted market can be modeled, as shown in block 4. Either before, during or after modeling the demand, a potential learning curve value can be selected from a set of potential learning curve values, as shown in block 6. Thereafter, recurring costs associated with the manufacture of the goods in the forecasted market can be modeled for the selected potential learning curve value, as shown in block 8.

After modeling the demand and recurring costs, gross profits for the sale of the good in the forecasted market can be modeled based upon the demand and recurring costs models, and thereafter a maximum gross profit can be determined, as shown in block 10. To model net profits for the sale of the good and/or determine the maximum net profit, however, nonrecurring costs associated with the manufacture of the goods are also modeled based on the selected potential learning curve value. The nonrecurring costs can then be added to the recurring costs to determine a total cost to manufacture the good, as also shown in block 8. In such instances, net profits for the sale of the good can be modeled based upon the demand model and the recurring costs model, as well as the nonrecurring costs model, with the maximum net profit being determined, as also shown in block 10.

The process of determining the maximum gross and/or net profits for the forecasted market can continue for all potential learning curves in the set of potential learning curves, as shown in blocks 12, 14. Then, with the maximum gross and/or net profits for all learning curve values in the set determined, the gross and/or net profits can be modeled as a function of learning curve values, as shown in block 16. Thereafter, an optimal learning curve value can be determined as the learning curve value associated with the maximum net profits (or maximum gross profits, if so desired) over all potential learning curve values in the set, as shown in block 18.

Modeling demand, as well as recurring costs, nonrecurring costs and profits will now be described in more detail.

I. Modeling the Demand for a Good

Modeling the net profitability of the good in a forecasted market typically begins with modeling the demand of a good, as well as modeling the associated costs of producing the good. In the economy, products can generally be categorized in one of two markets, either a non-differentiated market or a differentiated market. In a non-differentiated market, such as a commodity market, all competing goods are offered at a single price. For example, wheat, cotton, silver and oil are all goods that are typically offered at a single price. In a differentiated market, on the other hand, competing goods can be differentiated in the features that characterize the respective goods. As such, in a differentiated market, the distinguishing features allow different amounts of goods to be sold at different prices. For example, automobiles and aircraft are both goods that, due to differing features, can be sold at differing prices for differing quantities.

In a non-differentiated market, all goods are typically sold and purchased according to a single price for each unit of the good. In a differentiated market, however, the goods can vary in price. In this regard, goods in a differentiated market are typically sold according to contracts for a predetermined number of units of the good at a predetermined price for each unit. As such, to more accurately model profitability of the good, demand for the good can be modeled for goods in a non-differentiated market as well as a differentiated market.

A. Goods in Non-Differentiated Markets

The demand for a good in a non-differentiated market is generally a function of the price per unit of the good and the size of the market in terms of the total number of units of the good in the market, both of which differ depending upon the good. In this regard, in modeling the demand for some subsequent time in the future, neither the price of the good nor the size of the market can be specified as each includes an amount of uncertainty. Thus, to most accurately model the demand for the good such that the uncertainty in the price per unit and/or the size of the market are captured, the demand is typically modeled based upon a distribution of the possible prices for which the good may be sold, and a distribution of the possible sizes of the market within which the good may be sold.

Referring to FIG. 2, modeling the demand for a good in a non-differentiated market generally begins by assessing uncertainty in the price per unit of the good by determining how the price of the good affects whether customers will purchase the good. In this regard, uncertainty in the purchase price of each unit of the good is typically expressed in a price sensitivity distribution of a unit purchase of the good at a predetermined price, as shown in block 22. The price sensitivity distribution generally assigns a probability of a unit purchase to each respective price at which consumers would purchase the unit. The price sensitivity distribution can be expressed according to any of a number of different probability distribution types but, in one embodiment, the price sensitivity distribution is expressed as a lognormal probability distribution. For more information on such a price sensitivity distribution, as well as modeling the demand and gross profitability of the good, see U.S. patent application Ser. No. 10/453,727 entitled: Systems, Methods and Computer Program Products for Modeling Demand, Supply and Associated Profitability of A Good, filed Jun. 3, 2003, the contents of which are hereby incorporated by reference in its entirety.

Advantageously, and particularly in instances in which data of real or hypothetical cost data is sparse, uncertainty in the price of the good, or the price sensitivity distribution, can be defined based upon a state of development of technologies associated with the good. In this regard, in many industries, decisions about projects for the manufacture and sale of a good require manufacturers to estimate technical risk, or technical maturity, associated with the state of development of the project in order to correctly determine success probabilities and investment levels for the project, i.e., to determine risk and return probabilities. In this regard, development of the project can include one or more different technologies, with different technologies in different stages of development.

Whereas information regarding technical risk can be useful to manufacturers, such information is often qualitative. For example, one such group of qualitative measures of technical risk, or technical maturity, are the Technology Readiness Levels (TRL's) developed by the National Aeronautics and Space Administration (NASA). To account for the state of development of the associated technologies, each technology associated with the good is associated with a qualitative measure of maturity, where each qualitative measure of maturity is associated with a distribution. As such, each technology is associated with the distribution of the respective qualitative measure of maturity.

After associating each technology with the distribution of the respective qualitative measure of maturity, a price point, or more typically a most likely price, is selected for each technology. A price distribution can then be defined for each technology based upon the distribution associated with the respective qualitative measure of maturity and the respective most likely price. A price for each technology can be selected from the cost distributions, such as according to a Monte Carlo method, and thereafter summed together to get one possible total price for the good. As known to those skilled in the art, the Monte Carlo method is a method of randomly generating values for uncertain variables to simulate a model. Next, a number of other prices for each technology can be selected and summed together in a similar manner to get a number of other possible total prices. From all of the total prices, a mean and standard deviation can be determined to thereby define the price sensitivity distribution. For more information on such a method of determining the price sensitivity distribution, see U.S. patent application Ser. No. 10/453,395, entitled: Systems, Methods and Computer Program Products for Modeling a Monetary Measure for A Good Based Upon Technology Maturity Levels, filed Jun. 3, 2003, the contents of which are hereby incorporated by reference in its entirety.

Regardless of how the price sensitivity distribution is determined, in addition to factoring uncertainty in the price of the good into the demand for the good, the demand can advantageously be modeled as a function of the size of the market within which the good is purchased to thereby account for uncertainty in the size of the market. In this regard, uncertainty in the size of the market is typically represented as a market potential that refers to the total number of units of the good consumers will purchase presuming all consumer requirements are met, including price, as shown in block 24 of FIG. 2. The market potential is typically expressed as a distribution of consumers purchasing a predetermined number of units of the good. The market potential distribution generally assigns a probability to each respective number of units of the good consumers will purchase presuming all consumer requirements are met. Like the market sensitivity distribution, the market potential distribution can be expressed in any of a number of different types of distributions but, in one embodiment, is expressed as a lognormal probability distribution. For more information on such a market potential distribution, see U.S. patent application Ser. No. 10/453,727 entitled: Systems, Methods and Computer Program Products for Modeling Demand, Supply and Associated Profitability of a Good.

As stated, the demand for the good is modeled as a function of the size of the market within which the good is sold. Thus, to model the demand for the good a forecasted market of a predefined total number of units of the good is selected from the market potential distribution. Advantageously, the number of units in the forecasted market is selected according to a method for randomly selecting a predefined number of units of the good, such as the Monte Carlo method, as shown in block 26. And as described below, by repeatedly selecting different forecasted markets, a corresponding demand for the good can be modeled for each forecasted market to thereby facilitate an understanding of how different market sizes affect demand for the good.

As manufacturers will typically not be capable of capturing all (i.e., 100%) of the market for a good, demand for the good can be modeled to account for different percentages of the market that a manufacturer may capture. Therefore, from the forecasted market selected, a market penetration distribution can be determined based upon different numbers of units that represent corresponding percentages of the forecasted market, as shown in block 28. For example, as shown in FIG. 4, in a market size of 700 units of the good, a sale of 350 units would be associated with a market penetration of 50%. Once the market penetration distribution has been determined, the demand can be modeled based upon the price sensitivity distribution and the market penetration distribution. To combine the price sensitivity distribution and the market penetration distribution, the price sensitivity distribution is first recast in reverse cumulative format, as shown in FIG. 3. (See FIG. 2, block 30). As will be apparent, a reverse cumulative distribution depicts the number, proportion or percentage of values greater than or equal to a given value. In this regard, the reverse cumulative of the price sensitivity distribution represents the distribution of customers willing to purchase the good for at least a predetermined price, i.e., at or above a predetermined price.

Once the price sensitivity distribution has been recast, the demand for the product for the forecasted market can be modeled based upon the reverse cumulative of the price sensitivity distribution and the market penetration distribution, as shown in block 32 of FIG. 2. In this regard, the demand represents the number of units consumers will purchase for at least a given price, i.e., at or above a given price. To model the demand, each probability percent of the reverse cumulative of the price sensitivity distribution is associated with a corresponding percentage of the forecasted market from the market penetration distribution. Thus, each of a plurality of different numbers of units of the good from the market penetration distribution are linked to a minimum price per unit from the reverse cumulative price sensitivity distribution having a probability percent equal to the market penetration percent for the respective number of units. As such, the demand model can be thought of as a plurality of different numbers of units sold in the forecasted market, each number of units having a corresponding minimum price at which consumers will purchase the respective number of units. For example, a number of goods totaling 700 and having a market penetration of 100% is linked to a price per unit of approximately $77 million dollars having a probability percent of 100%. Thus, according to the demand model, 700 units of the good will be sold for at least $77 million dollars. The demand model can be represented in any one of a number of manners but, in one embodiment, the demand model is represented as a demand curve by plotting different numbers of units sold in the forecasted market versus the minimum price consumers will pay per unit for the good, as shown in FIG. 5.

It will be appreciated that the demand for the good is based upon the reverse cumulative of the price sensitivity distribution and the market penetration distribution. Thus, the steps in determining the reverse cumulative of the price sensitivity distribution and the market penetration distribution can be accomplished in any order relative to one another without departing from the spirit and scope of the present invention. For example, the price sensitivity distribution can be rewritten in reverse cumulative format before any or all of the steps in determining the market penetration distribution from the market potential distribution.

It will also be appreciated that for different numbers of units in the forecasted market, selected according to the Monte Carlo method, different market penetration distributions and, therefore, different demand models, will be determined as shown in FIG. 6. Thus, the demand model can account for the size of the market as affecting the demand for the good. In this regard, by repeatedly selecting different forecasted markets and repeating the method, the demand for the good in each forecasted market can be modeled. As described above and more fully below, the demand for the good can be modeled with the recurring costs in the forecasted market to thereby model the gross profit for the good in the forecasted market which, in turn, can be used to determine conclusions regarding the forecasted market, such as the optimum price per unit and the number of units sold. The conclusions can then be utilized to model the net profit for the good in the forecasted market by determining the nonrecurring costs for the selected learning curve value. And by repeating the method for different forecasted markets, the gross and net profitability can be modeled for each forecasted market. The conclusions for the forecasted markets, as well as the gross and net profitability models, can then be used, such as by the manufacturer, to facilitate an understanding of how uncertainty in the price of the good and number of units in the market affect demand, cost and profitability for the good. With such an understanding, the manufacturer can be in a better position to select a price at which to sell each unit of the good, as well as a number of units of the good to produce.

B. Goods in Differentiated Markets

Just as in the case of non-differentiated markets, to most accurately model the demand for the good in an uncertain market, the demand is preferably modeled based upon a distribution of the possible prices for which the good may be sold, and a distribution of the possible sizes of the market within which the good may be sold. Goods in differentiated markets differ from those in non-differentiated markets, however, in that the prices per unit of the goods are not uniform across the market. In this regard, prices per unit of the goods can be uniform within each of the plurality of contracts that include the units of the good that make up the market. Additionally, or alternatively prices per unit of the goods can be uniform within a given number of goods of the contract, such as a contract that includes 1-100 units of the good for $75M, 101-200 units for $70M, 201-300 units for $65M, etc. Thus, to most accurately model the demand for a good purchased in a differentiated market, consideration must also be given to the number of units of the good in each contract. And because the number of units in each contract can vary, the number of units per contract is preferably utilized in conjunction with the other distributions.

Referring now to FIG. 7, modeling the demand for a good in a differentiated market generally begins the same as modeling the demand in a non-differentiated market, that is by assessing uncertainty in the price per unit of the good by determining how the price of the good affects whether customers will purchase the good. In this regard, the price sensitivity of the good is typically expressed as before with the price sensitivity distribution, as shown in block 34. The market potential can likewise be expressed as before by a market potential distribution of consumers purchasing a predetermined number of units of the good, as shown in block 36. Also, as before, the demand is modeled as a function of the size of the market within which the goods are sold to thereby account for uncertainty in the size of the market. Thus, to model the demand for the product based on a forecasted market, the predefined number of units of the good in the forecasted market is selected from the market potential distribution according to the Monte Carlo method, as shown in block 38. Just as in the case of non-differentiated markets, and as described below, by repeatedly selecting different forecasted markets, a corresponding demand for the good purchased in a differentiated market can be modeled for each forecasted market.

As previously stated, non-differentiated markets differ from differentiated markets in that goods in non-differentiated markets are all sold and purchased for a uniform price, as opposed to differing prices based on individual units. In a differentiated market, the goods are sold according to contracts that each specify a predetermined number of units of the good at a predetermined price for each unit. Thus, there are many prices (one for each contract) for a forecasted market. As such, for differentiated markets, modeling the demand for the good further includes assessing the uncertainty in the number of contracts in the market, as well as uncertainty in the predetermined number of units of the good in each contract and the predetermined price per unit at which each unit in each contract is purchased. In this regard, uncertainty in the number of units in each contract can be assessed by determining a units per contract distribution, shown in block 40.

Like the price sensitivity and market potential distributions, the units per contract distribution is typically expressed as a distribution of units of the good included in each contract. The units per contract distribution generally assigns a probability to each respective number of units that may be included in a particular contract. The units per contract distribution can be expressed according to any of a number of different probability distribution types but, in one embodiment, is expressed as a lognormal probability distribution. For more information on such a units per contract distribution, see U.S. patent application Ser. No. 10/453,727 entitled: Systems, Methods and Computer Program Products for Modeling Demand, Supply and Associated Profitability of A Good.

With the price sensitivity distribution and the units per contract distribution, a contract purchases collection can be determined to include a number of contracts, each having a number of units of the good and an associated price per unit. Before determining the contract purchases collection, the forecasted market can be selected, such as according to the Monte Carlo method, so that the total number of units in all of the contracts included within the contract purchases collection can be based upon the forecasted market. Presuming a total capture of the forecasted market by the manufacturer (i.e., selling all of the units in the entire market), the total number of units in all of the contracts can then be set equal to the number of units in the forecasted market. But presuming less than a total capture of the forecasted market, the total number of units in all of the contracts can be set equal to a percentage of the number of units in the forecasted market. Whereas the method of the present invention described below refers to the forecasted market, it should be understood that in instances where less than a total capture of the forecasted market is presumed, the presumed capture of the forecasted market will preferably be utilized in place of the number of units in the forecasted market.

To determine the contract purchases collection, a relationship between the price sensitivity distribution and the units per contract distribution is first established (see FIG. 7, block 42), such as via a correlation coefficient. The correlation coefficient can be selected in any one of a number of manners, however, the correlation coefficient should be a non-positive number. In one embodiment, for example, the correlation coefficient is determined in accordance with conventional techniques based upon a number of historical contractual sales of the good or a similar good, where each sale includes a number of units of the good at a price per unit. For more information on determining such a correlation coefficient, see U.S. patent application Ser. No. 10/453,727 entitled: Systems, Methods and Computer Program Products for Modeling Demand, Supply and Associated Profitability of A Good.

Once the price sensitivity distribution is related to the units per contract distribution, the contract purchases collection can be determined by first determining the number of contracts and the number of units in each contract, as shown in block 44. The number of contracts can be determined in any of a number of different manners, such as by selecting a predefined number of contracts based upon the forecasted market and the number of units in each contract based upon historical contracts of the same or similar goods. Like the forecasted market, the number of units in each contract are typically determined according to the Monte Carlo method based upon the units per contract distribution. Because the forecasted market has been defined to include a predefined number of units of the good in the market, the aggregate number of units in each contract within the forecasted market totals the predefined number of units in the forecasted market or, alternatively, a percentage of the predefined number of units if less than total market capture of the forecasted market is presumed. In this regard, the Monte Carlo method can be used to repeatedly select different numbers of units in each contract, so long as the aggregate number of units in each contract within the forecasted market does not exceed the predefined number of units in the forecasted market (or percentage of the predefined number). By repeatedly selecting different numbers of units in the predefined number of contracts in the forecasted market, many different contract purchases collections can be determined for the forecasted market.

Either as the number of units in each contract is determined, or after the number of units is determined, the associated price per unit of the units in each contract is determined (e.g., according to a Monte Carlo method) based upon the number of units in the respective contract, the price sensitivity distribution and the correlation between the units per contract distribution and the price sensitivity distribution, as shown in block 46. With the number of units per contract and the associated price per unit of the units in each contract, the contract purchases collection can be determined as a plurality of contracts, with each contract having an associated number of units of the good at a given price per unit, as shown in block 48. The contract purchases collection can be represented in any one of a number of manners but, in one embodiment, the contract purchases collection is represented as a scatter plot of the units in each contract at the corresponding price per unit, as shown in FIG. 8 with a forecasted market of 681 units and a presumed market capture of 60% (i.e., 409 units).

As described above, the contract purchases collection can be determined by determining a correlation between the price sensitivity distribution and the units per contract distribution, selecting a number of contracts and a number of units in each contract according to the Monte Carlo method, and thereafter determining a price per unit contract. It will be understood, however, that the contract purchases collection can be determined in any of a number of different manners. For example, the contract purchases collection can be determined by determining the correlation and thereafter selecting a number of contracts, such as randomly selecting a defined number of contracts (e.g., 100 contracts). With the number of contracts, then, a price sensitivity distribution and a units per contract distribution can be defined for each contract, where the distributions can differ between one or more contracts or remain the same across all of the defined number of contracts. Where the distributions differ between one or more contracts, the correlation can similarly differ but, when the distributions remain the same across all of the contracts, the correlation is preferably the same across all of the contracts. It will be understood that the values from the price sensitivity distribution and the units per contract distributions are typically generated according to a Monte Carlo method using the correlation value. As such, it will also be understood that the price per unit for each contract can be determined before, after or as the units per contract are determined.

For each of the defined contracts, then, a number of units in the respective contract can be determined, such as from the units per contract distribution according to the Monte Carlo method. Then, an associated price per unit for each of the defined contracts can be determined based upon the number of units in the respective contract, the respective price sensitivity distribution and the correlation between the units per contract distribution and the price sensitivity distribution. Thereafter, as before, with the number of units per contract and the associated price per unit of the units in each contract, the contract purchases collection can be determined as a plurality of contracts, with each contract having an associated number of units of the good at a given price per unit.

As before, the demand for the good in the forecasted market represents the number of units consumers will purchase for at least a given price. In this regard, the price per unit of each contract can be ranked in descending from the highest price per unit down. A cumulative number of units for each different price per unit can then be calculated, as shown in block 50 of FIG. 7. The cumulative number of units for each price then would equal the cumulative number units across all of the contracts sold for a price per unit equal to or greater than the respective price. For example, the cumulative number of units associated with the highest price per unit would equal the number of units in each contact having the highest price per unit. Then, the cumulative number of units associated with the second highest price per unit would equal the number of units in each contract having the second highest price per unit plus the number of units in each contact having the highest price per unit.

It will be appreciated, however, that the price per unit of each contract can equally be ranked in ascending order from the lowest price per unit up. In such an instance, the cumulative number of units for each price would equal the total number of units in the forecasted market minus the number of units in each contract with a price per unit lower than the respective price. For example, the cumulative number of units associated with the lowest price per unit would equal the number of units in the forecasted market or, alternatively, the percentage of the forecasted market. The cumulative number of units associated with the second lowest price per unit would then equal the number of units in the forecasted market minus the number of units in each contract with the lowest price per unit.

With each different price per unit and the associated cumulative number of units, the demand for the good in the forecasted market, or percentage of the forecasted market, can be modeled based upon the price per unit of each of the contracts and the cumulative number of units sold for a price per unit equal to or greater than the respective price per unit, as shown in block 52. In this regard, as with the demand model for a good in a non-differentiated market, the demand model for a good in a differentiated market represents the number of units consumers will purchase for at least a given price. As such, the demand model can be thought of as a plurality of different numbers of units sold in the forecasted market, each number of units having a corresponding minimum price at which consumers will purchase the respective number of units. The demand model can be represented in any one of a number of manners but, like in the case of the model for the non-differentiated market, in one embodiment the demand model is represented as a demand curve by plotting the different prices per unit versus the cumulative number of units sold for a price per unit equal to or greater than the respective price per unit, as shown in FIG. 9 with a forecasted market of 681 units and a presumed market capture of 409 units. As illustrated, the demand model will not appear as smooth as the demand in the case of the non-differentiated market. The coarseness of the demand model for the differentiated market is due to the fact that the model uses distinct contractual sales, as opposed to considering the entire non-differentiated market as one contractual sale.

It will be appreciated that as the total number of units in the forecasted market changes according to the Monte Carlo method for the demand model for either the case of the non-differentiated market or the differentiated market, the demand model changes to fit the total number of units of the good. It will also be appreciated that for different numbers of units in the forecasted market, selected according to the Monte Carlo method, different values from the market penetration distributions and contract purchases collections will be determined for the good in the differentiated and non-differentiated market, respectively. And with the different market penetration distributions and different contract purchases collections, different demand models will be determined for each forecasted market. Thus, the respective demand models can account for the size of the market as affecting the demand for the good. In this regard, by repeatedly selecting different forecasted markets and repeating the method, the demand for the good in each forecasted market can be modeled.

As indicated above and described more fully below, modeling the demand for the good can be utilized with the recurring costs and nonrecurring costs models to thereby model the gross and net profitability of the good in the forecasted market which, in turn, can be used to determine conclusions regarding the forecasted market, such as the learning curve value, the optimum price per unit and the number of units sold. And by repeating the method for different forecasted markets, the profitability can be modeled for each forecasted market, and the conclusions can be determined for each forecasted market. The conclusions for the forecasted markets can then be used, such as by the manufacturer, to facilitate an understanding of how uncertainty in the price of the good, the number of units and/or contracts, as well as the price per unit of the good in the contracts, affects demand for the good. With such an understanding, then, the manufacturer can be in a better position to select a learning curve value, a price at which to sell each unit of the good and a number of units of the good to produce.

II. Modeling Costs Associated with Producing the Good

As stated above, costs can be divided into two different types, nonrecurring and recurring. As such, each can be modeled separately, as will be described below.

A. Modeling Recurring Costs

The recurring and nonrecurring costs can be modeled according to any of a number of different techniques. As an example of one method by which the recurring costs to manufacture each unit of a good can be modeled, reference is now made to FIGS. 10-16. Modeling the recurring costs to produce each unit of the good generally begins with assessing uncertainty in the recurring cost to produce each unit of the good, typically represented as a measure of how the cost of producing the good affects whether manufacturers will produce the good. In this regard, the cost sensitivity of the good is typically expressed as a distribution of manufacturers producing the good at a predetermined price. The cost sensitivity distribution generally assigns a probability of producing one unit of the good to each respective cost at which manufacturers would produce the good. Whereas the cost sensitivity can be expressed as any of a number of different types of distributions, the cost sensitivity according to the example is expressed as a lognormal probability distribution, and defined according to the mean and standard deviation of cost data, such as can be determined from market studies, cost analyses or the like. For example, the cost sensitivity distribution shown in FIG. 13 is defined according to a mean of $56,806 (in millions of dollars) with an associated standard deviation.

Like the price sensitivity distribution, the cost sensitivity distribution can be determined based upon the state of development of technologies associated with the good. In such instances, the cost sensitivity distribution can be determined as described above in conjunction with the price sensitivity distribution. In contrast to the cost sensitivity distribution, however, a cost point, or more typically a most likely recurring cost, is selected for each technology. Then, a cost distribution can then be defined for each technology based upon the distribution associated with the respective qualitative measure of maturity and the respective most likely cost. From a number of possible total recurring costs determined from costs selected from the respective distributions, a mean and standard deviation can be determined to thereby define the cost sensitivity distribution. For more information on such a method of determining the cost sensitivity distribution, see U.S. patent application Ser. No. 10/453,395, entitled: Systems, Methods and Computer Program Products for Modeling a Monetary Measure for A Good Based Upon Technology Maturity Levels.

To model recurring costs, a market is first forecast by selecting the number of units produced, as shown in block 54 of FIG. 10A. Thereafter, a potential learning curve value is selected from a set of potential learning curve values, as shown in block 56. The set of potential learning curve values can comprise all integers between zero and one hundred. In a more typical embodiment, however, the learning curve value is selected from a set including all integers between 70 and 100. In the example method, as previously stated, modeling the recurring cost to produce each unit of the good in the forecasted market includes assessing uncertainty in the cost of producing the good, as such may be represented as a measure of how the cost of producing the good affects whether manufacturers will produce the good, as such is typically expressed by the cost sensitivity distribution (see FIG. 13).

Modeling the recurring costs associated with the production of a good in an uncertain market is typically based on the average cost per unit to produce the good and the number of units produced, or sold. The cost of producing the good can be modeled in any one of a number of manners, but preferably considers the effect of the number of units produced, or sold, on the cost to produce each unit of the good. In this regard, costs associated with producing a good in many markets tend to decline as the manufacturer gains experience with that production. Whereas one might expect the cost of producing each unit of the good to remain constant, the cost to produce the first units of the good is typically more than the expected cost of producing subsequent units. And as the number of units produced increases, the manufacturer gains experience that drives the cost to produce each unit down to the expected cost and below, and thereafter eventually leveling to an optimum cost of producing each unit. The change in the cost to produce each unit can generally be considered to be attributable to learning. In this regard, a learning curve value describes the amount of learning that a process can achieve or how much the cost declines with production.

To account for the learning curve for producing the good, modeling the recurring cost may further include using a learning curve. In this regard, the recurring cost model may be generally defined according to a number of characteristics, such as the learning curve type, the selected potential learning curve value, and calibration values, as such may be determined as described below. Further, the recurring cost model may be fitted to the size of the forecasted market.

In one embodiment, for example, the recurring cost model can be determined for each forecasted market. As shown in FIG. 11, in embodiments in which the learning curve type is log-linear (i.e., has a linear shape in log-log space), an intermediate value (Learn Calc) for determining the recurring cost model can be calculated as follows:

$$LearnCalc = \frac{\left(\frac{1}{coeff\_factor}\right) \times ((CumUnits + 0.5)^{coeff\_factor} - (1 - 0.5)^{coeff\_factor})}{\left(\frac{1}{coeff\_factor}\right) \times ((CalUnits + 0.5)^{coeff\_factor} - (1 - 0.5)^{coeff\_factor})},$$

where coeff_factor=((ln(LC/100))/ln(2))+1. In the foregoing equations, LC represents the selected potential learning curve value, CumUnits represents the cumulative number of units of the good sold in the forecasted market, and CalUnits represents the number of units the manufacturer must produce to have an average cost per unit equal to the constant expected cost of producing each unit. It will be appreciated that although the learning curve type has been described as being a log-linear type learning curve, the learning curve can be any of a number of different types of learning curves, such as a Stanford-B type learning curve, a DeJong type learning curve, an S-Type learning curve or the like.

Either before, after or as the learning curve type is determined, the cost to manufacture the first unit of the good (i.e., the T#1 cost) can be determined. Whereas the T#1 cost can be determined in any of a number of different manners, in one embodiment the T#1 cost is determined based upon the selected potential learning curve value from a model of T#1 cost as a function of potential learning curve values, as shown in block 58, and described more fully below. As shown in block 60, after determining the T#1 cost, the recurring cost can be modeled in the forecasted market for the selected potential learning curve value by the following equation:

$$Recurring\ Cost = T\#1\ Cost \times \frac{CalUnits}{CumUnits} \times LearnCalc$$

where T#1 Cost in the above equation represents the T#1 cost determined from the T#1 cost model. The recurring costs model for the forecasted market can be represented in any one of a number of different manners but, in one embodiment, the cost model is represented as an average recurring cost curve by plotting the average cost per unit versus the cumulative number of units produced, as shown in FIG. 12.

As stated above, in modeling recurring costs, the T#1 cost can be determined from a model of T#1 cost as a function of potential learning curve values. In this regard, the T#1 cost can be modeled as a function of potential learning curve values in any of a number of different manners. In one embodiment, now referring to FIG. 10B, a method of modeling the T#1 cost begins by selecting a unit cost from the cost sensitivity distribution (see FIG. 13), as shown in block 62. Advantageously, the unit cost can be selected according to a method for randomly selecting a predefined unit cost, such as the Monte Carlo method. In this regard, the Monte Carlo method is applied to the cost sensitivity distribution to select the predefined unit cost.

After selecting the unit cost, a fixed cost associated with producing the first unit of the good, referred to as the fixed T#1 cost, is determined based upon the selected unit cost, as shown in block 64. Additionally, the fixed T#1 cost can be determined based upon a number of benchmark characteristics, such as a benchmark learning curve value, and a benchmark calibration value associated with the number of units the manufacturer must produce to have an average cost per unit equal to the selected cost of producing each unit. The benchmark values can be selected in a number of different manners, such as from market studies, cost analyses or the like. For example, the benchmark learning curve value can be selected to be 85, while the benchmark calibration value is set at 500. With the selected unit cost, benchmark learning curve value and benchmark calibration value, then, the fixed T#1 cost can be determined. The fixed T#1 value can be determined in any of a number of different manners but, in one embodiment, the fixed T#1 cost is determined as follows:

$$Fixed\ T\#1 = \frac{Unit\ Value}{Benchmark\ Calibration\ Value}\left(log_{10}\left(\frac{Benchmark\ Learning\ Curve\ Value}{log_{10}(2)}\right)-2\right)$$

For example, presuming the unit cost is selected from the cost sensitivity distribution to equal $54,000, and the benchmark learning curve value and calibration value set at 85 and 500, respectively, the fixed T#1 cost can be determined to equal $231,851.

After determining the fixed T#1 cost, the recurring cost to produce the good can be determined in a manner that advantageously accounts for how the recurring cost to produce the first unit, the T#1 cost, relates to the recurring cost to produce subsequent units as a function of different, potential learning curve values. In this regard, the relationship between the recurring cost for subsequent units and the T#1 cost can be represented by a variance factor which, in turn, can be determined as a function of potential learning curve values. More particularly, the variance factor can reflect the level of recurring costs as compared to the standard, or benchmark, fixed T#1 cost. As will be appreciated, then, a variance factor of one is standard. The higher the variance factor, the higher the recurring costs to the standard, fixed T#1 cost. In contrast, the lower the variance factor, the lower the recurring costs to the standard, fixed T#1 cost.

To determine the variance factor, variance is determined as a function of potential learning curve values, as shown in block 66. The variance can be determined in a number of different manners such as, for example, by establishing a number of variance values associated with different learning curve values. The variance values and learning curve values can be established in a number of different manners. In one embodiment, shown in FIG. 14A, the variance values and learning curve values are established from theoretical T#1 variance values associated with different learning curve values, as such may be determined by an estimator or the like. After establishing the variance values and associated learning curve values, a best fit curve of variance as a factor of potential learning curve values can be established according to the unit curve theory based upon the data, as shown in FIG. 14B. For example, the best fit curve can be established as follows:

$$\text{Variance(Learning Curve Value)} = a + e^{b + c \times \text{Learning Curve Value}}$$

In the above, equation, a, b and c are constants that are selected based upon the best fit curve which, in turn, is based upon the variance values and associated learning curve values. In one embodiment, for example, the values of a, b and c are selected to be 2.61, 16.61 and −0.1836, respectively.

Although the best fit curve can be established as indicated above, it will be appreciated that a number of different best fit curves can be established based upon assumptions made about the curve (e.g., the variance decreases as the learning curve value increases, variance changes less as the learning curve value increases, etc.). Thus, a number of different best fit curves can be established based upon the variance values and learning curve values, with all of the best fit curves generally fitting the data. The best fit curve, then, can be established as desired, with the above best fit curve established to provide an desired amount of control over the curve, with the values of a, b and c being capable of being easily modified.

After determining the variance as a factor of potential learning curve values, the variance factor as a function of potential learning curve values can be determined based upon the variance and a benchmark variance determined based upon the benchmark learning curve value, as shown in block 68. For example, according to one embodiment, the variance factor can be determined as follows:

$$\text{Variance Factor(Learning Curve Value)} = \frac{\text{Variance(Learning Curve Value)}}{\text{Variance(Benchmark Learning Curve Value)}}$$

Substituting the example values of a, b, c and the benchmark learning curve value given above, then, the variance factor can be determined to be:

$$\text{Variance Factor(Learning Curve Value)} = \frac{2.61 + e^{16.61 - .1836 \times \text{Learning Curve Value}}}{5.34}$$

After determining the variance factor, the T#1 cost associated with producing the good can be modeled as a function of potential learning curve values based upon the variance factor and the fixed T#1 cost, as shown in block 70. In one embodiment, for example, the T#1 cost can be modeled by multiplying the variance factor by the fixed T#1 cost. In mathematical terms, then, the T#1 cost can be modeled as a factor of potential learning curve values as follows:

$$T\#1(\text{Learning Curve Value}) = \text{Variance Factor(Learning Curve Value)} \times \text{Fixed } T\#1$$

After modeling the T#1 cost as a function of potential learning curve values, recurring costs can be modeled as a function of potential learning curve values. As will be appreciated, each learning curve may have many possible values of recurring cost. As such, in one more particular embodiment, the recurring costs that optimize net profits, taking into account demand for the good in a forecasted market, can be modeled as a function of potential learning curve values, as shown in FIG. 15. It will be appreciate that, as shown, the recurring costs drop dramatically when the learning curve value exceeds a certain value (approximately 93 as shown in FIG. 15). In this regard, in the context of producing a good, the drop in recurring costs at high learning curve values typically corresponds to instances in which a manufacturer would never recoup the non-recurring costs associated with a good to turn a profit. Thus, the manufacturer would typically not produce the good when the non-recurring costs and, thus, learning curve value, exceed a certain value. Although not shown in FIG. 15, the recurring costs also decrease dramatically when the learning curve value drops below a certain value. In the context of producing a good, the drop in recurring costs at low learning curve values can correspond to instances in which the improvement in producing the good over time and, thus, drop in recurring costs over time, would be very small. In such instances, it would require such an undesirable amount of time for the recurring costs to reach a point where the manufacturer would turn a profit, if the recurring costs ever reached such a point, that the manufacturer would likely elect to not produce the good.

Just as in the case of modeling demand for the good, the recurring cost to produce the good differs between non-differentiated and differentiated markets. The recurring costs of producing the good in the differentiated market can be modeled in any one of a number of manners, such as according to the method described above in conjunction with selecting a learning curve value and modeling the recurring costs in the forecasted market in the case of non-differentiated goods. Because the demand for the good in the forecasted market represents the number of units consumers will purchase for at least a given price, the learning curve used to model the recurring costs are based upon the selected learning curve value and is a function of the cumulative number of units associated with each price per unit, as described above in conjunction with modeling the demand for goods in a differentiated market. As shown in FIG. 16, just as the demand for the differentiated market appears coarse as a plurality of connected contractual sales, the recurring costs curve likewise appears as a plurality of connected costs for producing respective cumulative numbers of units for each price per unit.

B. Modeling Nonrecurring Costs

Reference is now drawn to FIGS. 17A and 17B, which illustrate two embodiments of a method of modeling the nonrecurring costs associated with producing a good. To model the nonrecurring costs according to the illustrated embodiment of FIG. 17A, the nonrecurring costs are first related to potential learning curve values, as shown in block 72. The nonrecurring costs can be related to potential learning curve values in a number of different manners such as, for example, by establishing a number of nonrecurring costs values associated with different learning curve values. The nonrecurring costs values and learning curve values can be established in a number of different manners and, in one embodiment shown in FIG. 18A, the nonrecurring costs values and learning curve values are established from theoretical nonrecurring costs values associated with different learning curve values, as such may be determined by an estimator or the like.

After establishing the nonrecurring costs values and associated learning curve values, then, a best fit curve of nonrecurring costs as a factor of potential learning curve values can be determined according to the unit curve theory based upon the data, as shown in FIG. 18B. For example, the best fit curve of nonrecurring costs can be established to be:

Nonrecurring Cost(Learning Curve Value)=$d \times e^{f+g \times \text{Learning Curve Value}}$ In the above, equation, constants d and g are constants that are based upon the best fit curve, and can be selected in a number of different manners, as shown in block 74. In this regard, d can be considered a scale factor that allows the nonrecurring costs value to be scaled to any number of different cost levels. For example, in one embodiment the nonrecurring costs assumes that cost levels are $10^6$ (i.e., $d=10^6$) times greater than the determined value such that cost values determined are scaled by a million dollars. The constant g can be considered a learning curve value sensitivity value that measures how much the learning curve value affects the nonrecurring costs. As such, g can be selected as desired. In one embodiment, for example, g can be selected to equal −0.257.

The constant f can be considered a measure of uncertainty, referred to herein as an uncertainty value, that directly affects the nonrecurring costs value. And as the uncertainty of the nonrecurring costs value can typically vary, the constant is preferably selected from a distribution, such as a risk distribution, as shown in block 76. The risk distribution can be determined in any of a number of different manners, such as by an estimator or the like. Similarly, the risk distribution can be represented by any of a number of different distributions but, in one example, the risk distribution is represented by a triangular distribution, as shown in FIG. 19. As shown in FIG. 19, for example, the risk distribution can be represented by a triangular distribution having a minimum value of −8.20, a maximum value of −7.80, and a mode of −8.00. Like the cost sensitivity distribution, the uncertainty value f can advantageously be selected according to a method for randomly selecting a predefined unit cost, such as the Monte Carlo method. For example, from the risk distribution shown, the uncertainty value can be selected to equal −8.12.

As before, it will be appreciated that a number of different best fit curves can be established based upon assumptions made about the curve (e.g., the nonrecurring costs increase as the learning curve value increases, nonrecurring costs change less as the learning curve value decreases, etc.). Thus, a number of different best fit curves can be established based upon the nonrecurring costs values and learning curve values, with all of the best fit curves generally fitting the data. The best fit curve, then, can be established as desired, with the above best fit curve established to provide an desired amount of control over the curve, with the values of d, f and g being capable of being easily modified.

After selecting the constants d, f and g, the nonrecurring costs to produce the good can be modeled as a function of potential learning curve values, as shown in block 78. For example, according to one embodiment, the nonrecurring costs can be modeled by substituting the values for d, f and g into the best fit curve for nonrecurring costs. According to the examples given above for d, f and g, in mathematical terms the nonrecurring costs (NRC) can be modeled as a factor of potential learning curve values as follows:

NRC(Learning Curve Value)=$10^6 \times e^{-8.12-0.257 \times \text{Learning Curve Value}}$ Like the recurring costs model, the nonrecurring costs model can be represented in any one of a number of manners but, in one embodiment, the nonrecurring costs model is represented as a recurring costs curve by plotting the nonrecurring costs over a range of potential learning curve values, as shown in FIG. 20.

Similar to the price sensitivity distribution and the cost sensitivity distribution, uncertainty in the nonrecurring cost of the good can be defined based upon a state of development of technologies associated with the good. Referring now to FIG. 17B, another embodiment of modeling nonrecurring costs can account for the state of development of the technologies associated with the manufacture of the good. In this embodiment, nonrecurring costs are modeled by first associating each technology associated with the nonrecurring costs to produce the good with a qualitative measure of maturity, where each qualitative measure of maturity is associated with a distribution, as shown in block 80. As such, each nonrecurring technology is associated with the distribution of the respective qualitative measure of maturity. In this regard, each nonrecurring technology can be associated with high and low nonrecurring cost values based upon the respective distribution, as shown in block 82. As described more fully below, such high and low nonrecurring cost values for the respective distributions can then be used to determine a risk distribution for the respective nonrecurring technologies.

After associating each nonrecurring technology with the distribution of the respective qualitative measure of maturity, a cost point, or more typically a most likely nonrecurring cost (MLC), is selected for each technology, such as by the user. To determine the mode of the risk distribution for each nonrecurring technology, the equation for the best fit curve for nonrecurring costs can be rewritten to solve for the uncertainty value f as follows:

$$f = \ln\left(\frac{MLC}{d}\right) = -g \times LearningCurveValue$$

In the above equation, f represents the mode of the risk distribution for the respective nonrecurring technology, MLC represents the most likely nonrecurring cost, and d and g represent the scale factor and learning curve value sensitivity value, respectively. Also in the above equation, Learning Curve Value represents the benchmark learning curve value, as such is described above with respect to modeling T#1 cost.

With the high and low nonrecurring cost values and the mode for each nonrecurring technology, a risk distribution can be defined for each nonrecurring technology. Thereafter, as shown in block 86, an uncertainty value (f as described above in conjunction with FIG. 17A) can be selected for each nonrecurring technology, such as according to the Monte Carlo method.

As will be appreciated, in some instances it may be desirable to hold constant the learning curve value for one or more nonrecurring technologies, such as when examining the effect of different learning curve values on one or more other nonrecurring technologies. As such, after selecting an uncertainty value for each nonrecurring technology, the nonrecurring technologies can be separated into those technologies that have variable learning curve values and those technologies that have constant learning curve values, as shown in block 88.

For each nonrecurring technology having a variable learning curve value, nonrecurring costs are modeled as a function of potential learning curve values, such as by using the equation for the best-fit curve for nonrecurring costs described above, as shown in block 90. After modeling the nonrecurring costs for such nonrecurring technologies, the nonrecurring cost models for all such nonrecurring technologies are summed together, as shown in block 92. For each nonrecurring technology having a constant learning curve value, the nonrecurring cost for the respective technologies at the respective constant learning curve values is determined, such as by using the equation for the best-fit curve for nonrecurring costs, as illustrated in block 94. Thereafter, the nonrecurring costs for each such nonrecurring technology are summed together, as shown in block 96. To model the nonrecurring costs for the good over all of the nonrecurring technologies, then, the sum of the nonrecurring cost models for variable learning curve values is summed with the sum of nonrecurring cost values determined for nonrecurring technologies with constant learning curve values, as shown in block 98.

As will be appreciated, as nonrecurring costs are typically those associated with an initial investment to begin producing a good, such costs are typically not based upon the number of units produced, or sold. In other terms, nonrecurring costs are typically not dependent upon whether the goods are within a non-differentiated or differentiated market. Therefore, the model of nonrecurring costs as a function of potential learning curve values will be the same for both non-differentiated and differentiated markets.

As will also be appreciated by those skilled in the art, modeling the recurring and nonrecurring costs are independent of one another. In this regard, the learning curve can be determined irrespective of whether the recurring costs are modeled before or after nonrecurring costs. Thus, although recurring costs are shown and described as being modeled before nonrecurring costs, nonrecurring costs can be modeled before modeling recurring costs without departing from the spirit and scope of the present invention.

It will also be appreciated that for different unit costs selected from the price sensitivity distribution, selected according to the Monte Carlo method, different recurring costs models, can be determined. Similarly, for different uncertainty values selected from the risk distribution, different nonrecurring costs models can be determined. Thus, the recurring costs and nonrecurring costs models can account for the unit price and magnitude factor as affecting the respective costs for the good. In this regard, by repeatedly selecting different unit costs and/or different uncertainty values and repeating the method, the respective costs of producing the good can be modeled.

Further, it will be appreciated that the system, method and computer program product of embodiments of the present invention can be utilized by manipulating data within any one of a number of commercially available computer software programs. For example, the method can be utilized by manipulating data within Excel, a spreadsheet software program distributed by the Microsoft Corporation of Redmond, Wash., including Crystal Ball, a Monte Carlo simulation software program distributed by Decisioneering, Inc. of Denver, Colo.

III. Modeling the Profitability of a Good

By utilizing the recurring cost model, the nonrecurring cost model, and the demand model, the profitability of the good can be modeled thereby facilitating an understanding of how uncertainty in demand for the good, as well as uncertainty in cost of producing the good, can affect profitability. In this regard, just as the demand model differs depending on whether the goods are in a non-differentiated market or a differentiated market, the profitability of the good also differs depending on the type of market. As such, the present invention provides systems, methods and computer program products for modeling the profitability of a good for goods in both non-differentiated markets as well as differentiated markets.

A. Goods in Non-Differentiated Markets

Modeling the gross and net profitability, respectively, of a good in a non-differentiated market generally begins by modeling the demand for the good according to embodiments of the present invention, as described above. Along with modeling the demand for the good, the recurring costs of producing the good is also modeled in the forecasted market, as also described above. Thereafter, the gross profitability of the good for the forecasted market can be modeled. In this regard, the gross profitability can be represented as the result of subtracting the cost per unit from the price per unit and multiplying the difference by the number of units sold for the corresponding fraction of the forecasted market. Thus, as shown in FIG. 21, by simultaneously plotting the demand curve and the cost curve for the forecasted market, the gross profitability can be seen as directly related to the distance between the two curves. Like the demand model and the cost model, the gross profitability model can be represented in any one of a number of different manners. In one embodiment, shown in FIG. 22, the gross profitability model can be represented as a gross profitability curve by plotting the number of units that must be sold to achieve at least a given gross profit.

From the gross profitability model, as well as the demand and recurring costs models, conclusions regarding the forecasted market can be drawn from collectively modeling the demand, recurring costs and gross profitability for the forecasted market. For example, the maximum gross profit for the good in the forecasted market can be seen as the point where the price exceeds the cost by the greatest amount. By determining the maximum gross profit, the optimum price per unit of the good and the optimum number of units sold in the forecasted market (i.e., fraction of the number of goods in the market), as well as the corresponding recurring costs can be determined.

After modeling the gross profitability and/or determining the maximum gross profit, the net profitability can be modeled and/or the maximum net profit can be determined based upon the gross profitability model and the nonrecurring costs associated with the selected learning curve. As the nonrecurring costs are not associated with the number of goods sold, as such is forecasted, the nonrecurring costs can be determined at any point after selecting the learning curve value. In this regard, the nonrecurring costs can be determined, such as is described above, utilizing the selected learning curve value.

After determining the nonrecurring costs, the net profitability of the good can be modeled by subtracting the nonrecurring costs from the gross profit at each point in the gross profitability model. Thus, the net profitability model, when plotted, will appear similar to the gross profitability model except that the net profitability model will have lower profit at each point, when compared to the gross profitability. For a comparison of the net profitability model and the gross profitability model, see FIG. 22, where the net profitability model can be represented as the dashed line. As will be appreciated, because the nonrecurring costs are not determined as a function of the number of goods sold, the maximum net profit can be determined, for example, by simply subtracting the nonrecurring costs from the maximum gross profit. Once all potential learning curve values have been selected such that the maximum gross and/or net profit has been determined for each, the gross profitability and/or net profitability of the good can be modeled as a function of potential learning curve values. To model the gross profitability as a function of potential learning curves, according to one embodiment of the present invention, the maximum gross profitability for each potential learning curve value is plotted against the respective learning curve value, as shown in FIG. 23. Similar to modeling gross profitability as a function of potential learning curve values, net profitability can also be modeled as a function of potential learning curve values. As previously indicated, net profit can be determined by subtracting nonrecurring costs from gross profit. In this regard, net profitability can be modeled based upon the model of gross profitability as a function of potential learning curves, and further based upon the model of nonrecurring costs as a function of potential learning curve values, as such can be determined as described above. For example, as shown in FIG. 24, the model of net profitability as a function of potential learning curve values can be represented as a net profitability curve by plotting the learning curve value that must be utilized to achieve at least a given net profit. As shown, the net profitability model illustrated has a maximum net profit when the learning curve value is selected to equal 78, as shown by a maximum in the net profitability curve.

At this point it should be made clear that the demand and the cost models as functions of a forecasted market, as well as the profitability models as functions of a forecasted market, up to this point have all been tied to one forecasted market of a predefined number of goods selected according to a method for randomly selecting a predefined number of units of the good, such as the Monte Carlo method. Further, as stated above, the recurring costs and nonrecurring costs models as functions of learning curve values have been tied to one unit cost and uncertainty value, respectively, selected according to any of a number of different methods, such as the Monte Carlo method. Thus, the learning curve value has been determined based upon a respective unit cost and uncertainty value. As such, after analyzing the forecasted market by determining, for example, the optimum price for each unit, optimum number of goods and corresponding price for each unit, as well as the maximum gross and/or net profit of the good, the conclusions can be recorded, and thereafter the method can then be repeated a plurality of times for different forecasted markets, as well as for different unit costs and/or different uncertainty values to thereby determine different learning curve values, with the forecasted markets, unit costs and/or uncertainty values selected such as according to the Monte Carlo method, with the conclusions recorded for each forecasted market.

The conclusions for all of the forecasted markets can be organized in any of a number of different manners. For example, referring to FIG. 25A, the maximum net profit for a number of different learning curve values can be plotted against associated learning curve values. In such an instance, the forecasted market can be held constant based on one selected forecasted market. Different learning curve values can then be determined, such as by selecting different unit costs and/or different uncertainty values. From the different learning curve values, different optimum prices and different optimum numbers of units can be determined, which can thereafter be utilized to determine different maximum net profits. In one embodiment, the maximum net profits for the different potential learning curve values can be averaged to produce a mean maximum profit for the respective potential learning curve values. The mean maximum profits can then be plotted against the respective learning curve values, as shown in FIG. 25B.

The conclusions for all of the forecasted markets can also be organized into respective distributions. The distributions can then be defined, such as by a curve type and a mean and associated standard deviation. From the distributions, then, a business case for the good can be created. For example, the business case can receive distributions for the optimum price for each unit, optimum number of goods and corresponding price for each unit. Based upon the distributions, then, the market value of the project can be determined and plotted over time, as shown in FIG. 26. As shown, the business case can plot the nonrecurring costs associated with the project (shown below zero for years three through five). Additionally, the business case can plot the net profit associated with the project, as determined by the difference between gross profits and recurring costs (shown above zero for years six through fourteen).

B. Goods in Differentiated Markets

In differentiated markets, modeling the gross and net profitability also generally begins by modeling the demand for a number of contracts for the good including the number of units and associated price per unit. In this regard, the demand for the good can be modeled according to the present invention as described above with reference to FIGS. 7, 8 and 9. Similarly, the recurring cost for the good can be modeled according to the present invention as described above with reference to FIG. 16. In the differentiated market, the gross profitability and net profitability can therefore be represented in a manner similar to the non-differentiated market. For example, the gross profitability can be represented for each contract as the difference of the respective price per unit and the respective recurring costs per unit multiplied by the number of units sold for the respective contract.

As will be apparent, since the demand model for the good in the context of a differentiated market describes individual contractual sales, and the recurring costs model describes average cost and is based on a number of units sold, a number of units sold must be selected in order to model the gross profitability, and thus the net profitability, of the good for the forecasted market. If the number of contracts or the number of units in one or more contracts changes, or if the number of units in the presumed percentage capture of the market changes, the average recurring costs of producing the units for each contract would likewise change, thus changing the model of the gross profitability and the net profitability.

To model the gross profitability or net profitability for all possibilities of the number of units in each contract would take an unnecessarily long period of time. But modeling the gross or net profitability for all possibilities is not necessary. In this regard, in a differentiated market it has been found that selling and, thus producing, as many units as possible always attains the most profit. Therefore, in modeling the profitability, the recurring costs model can be replaced with the lowest recurring costs value for the respective forecasted market (shown by the dashed line on FIG. 16), or for the percent capture of the forecasted market. The recurring costs model can be so replaced since the lowest cost value always corresponds to capturing the expected market share of the forecasted market and, thus, selling all of the units of the good the manufacturer produces. Profitability (gross and net), then, can be measured by the profitability of the forecasted market (presuming total market capture) based upon the profitability of each contractual sale within the forecasted market.

Thus, from the demand model, the gross profitability of each contractual sale can be determined by subtracting the lowest average cost to produce the number of units in the contract from the price per unit of the units in the contract, and multiplying the difference by the number of units in the contract. The gross profitability of the forecasted market can then be modeled by determining the summation of the gross profitability of each contractual sale.

In differentiated markets conclusions regarding the forecasted market can be drawn from collectively modeling the demand, cost (or lowest cost value) and profitability for the forecasted market. For example, because the maximum gross profit corresponds to selling as many units as possible, the maximum gross profit for the good in the forecasted market (or in the percent capture of the forecasted market) can be seen as the point where all of the units of the good in either the market, or percent capture of the market, have been sold. Also, for example, an optimum price to achieve maximum gross profits can be determined, such as by determining a weighted average price per unit from all of the contractual sales in the forecasted market (or captured percentage). Other conclusions might include the number of units in the forecasted market, the number of units sold in the presumed capture of the forecasted market (if less than total capture), the number of units not sold by the manufacturer in the forecasted market (again presuming less than total capture), and the maximum gross profit margin for the forecasted market (or captured percentage).

After modeling the gross profitability and/or determining the maximum gross profit, the net profitability can be modeled and/or the maximum net profit can be determined based upon the gross profitability model and the nonrecurring costs associated with the selected learning curve. As the nonrecurring costs are not associated with the number of goods sold, as such is forecasted, the nonrecurring costs can be determined at any point after selecting the learning curve value. In this regard, the nonrecurring costs can be determined, such as is described above, utilizing the selected learning curve value.

After determining the nonrecurring costs, the net profitability of the good can be modeled by subtracting the nonrecurring costs from the gross profit at each point in the gross profitability model. Thus, the net profitability model, when plotted, will appear similar to the gross profitability model except that the net profitability model will have lower profit at each point, when compared to the gross profitability. As will be appreciated, because the nonrecurring costs are not determined as a function of the number of goods sold, the maximum net profit can be determined, for example, by simply subtracting the nonrecurring costs from the maximum gross profit.

It will also be appreciated that the costs associated with producing the good, i.e., the recurring costs and the nonrecurring costs, can be modeled as a function of potential learning curve values. The gross profitability and/or net profitability of the good in the differentiated market can also be modeled as a function of potential learning curve values.

To model the gross profitability as a function of potential learning curves, according to one embodiment of the present invention, the gross profitability is modeled based upon the contractual revenue, which can be determined by summing the revenue generated from each contract captured from a given market. In addition, the gross profitability is modeled based upon the optimum number of units (i.e., selected number of units) sold in the forecasted market (i.e., fraction of the number of goods in the market), as such may be determined as described above with respect to the differentiated market. Further, the gross profitability, according to one embodiment, is modeled based upon the recurring costs model, as such may be determined as described above.

Similar to modeling net profitability as a function of potential learning curve values for a good in the non-differentiated market, net profitability can also be modeled as a function of potential learning curve values for a good in the differentiated market. As previously indicated, net profit can be determined by subtracting nonrecurring costs from gross profit. As before, net profitability can be modeled based upon the model of gross profitability as a function of potential learning curves, and further based upon the model of nonrecurring costs as a function of potential learning curve values, as such can be determined as described above in conjunction with a good in the non-differentiated market. Also, like the model of gross profitability as a function of potential learning curve values, the model of net profitability as a function of potential learning curve values can be represented in any one of a number of different manners, such as by plotting the learning curve value that must be utilized to achieve at least a given net profit.

Also just as in the case of non-differentiated markets, the demand and the recurring costs, as well as the profitability of the good for differentiated markets, up to this point have all been tied to a forecasted market of a predefined number of goods selected according to the Monte Carlo method. After analyzing the forecasted market by determining, for example, the maximum profit, the weighted average price, number of units and cost, the conclusions can be recorded. Once the conclusions have been recorded, the method can then be repeated a plurality of times for different forecasted markets selected according to the Monte Carlo method, with the conclusions recorded for each forecasted market. The conclusions for all of the forecasted markets can then be organized into respective distributions. The distributions can then be defined, such as by a curve type and a mean and associated standard deviation. And from the distributions, a business case for the good can be created, such as in a manner similar to that shown in FIG. 26.

IV. Contingent Claims and Implementing Embodiments of the Present Invention

As shown in FIGS. 25A and 25B, for certain quantities of units sold, the profitability model actually demonstrates a negative profitability, or a loss for sales of the good. Thus, it is oftentimes desirable to determine whether the profitability of the good is positive before exercising a contingent claim, such as whether to initiate or continue the project. Alternatively, it is desirable to determine whether the profitability of the good is above a predetermined threshold before exercising the contingent claim. Contingent claims oftentimes come in the form of a call in which the manufacturer has an option to invest an amount of money, or additional amounts of money, in order to start producing or continue producing the good. As such, if the initial stages of the production and sale of the good have proved unsuccessful and/or if the future prospects for the profitability of the good appear bleak, the manufacturer will likely decline to invest the money, or additional money, and thereby forego exercise of the call and will therefore decline to produce the good or terminate production of the good. Alternatively, if the initial stages of the production and sale of the good have been successful and/or if the prospects of the profitability of the good are bright, the manufacturer will likely make the necessary investment in order to begin or continue production of the good.

Regardless of the type of contingent claim, it is desirable to determine the value of a good and, in particular, the contingent claim at the present time. By determining the value of the contingent claim, the manufacturer can avoid overpaying for production of the good as a result of an overvaluation of the contingent claim. Conversely, the manufacturer can identify goods in which the value of the contingent claim has been undervalued and can give strong consideration to investing in the production of these goods since they likely represent worthwhile investment opportunities. As such, by modeling the demand and cost of a good and, thus, the profitability of a good, the systems, methods and computer program products of the present invention can facilitate determining the value of the good and, in particular, the contingent claim at the present time. For more information on determining the value of the project, see U.S. patent application Ser. No. 09/902,021 entitled: Systems, Methods and Computer Program Products for Performing a Generalized Contingent Claim Valuation, the contents of which are hereby incorporated by reference in its entirety.

Embodiments of the present invention are therefore capable of modeling the demand and associated gross and net profitability while better accounting for variability in the relationship of the price of the good and the number of units of the good purchased, as well as the variability in the relationship of the cost of producing the good and an associated learning curve value. As such, embodiments of the present invention can better model the gross and net profitability to thereby maximize such profitability.

As shown in FIG. 27, the system of the present invention is typically embodied by a processing element and an associated memory device, both of which are commonly comprised by a computer 100 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program, including Crystal Ball, a Monte Carlo simulation software program. The computer can include a display 102 for presenting information relative to performing embodiments of the method of the present invention, including the various distributions, models and/or conclusions as determined according to embodiments of the present invention. To plot information relative to performing embodiments of the method of the present invention, the computer can further include a printer 104.

Also, the computer 100 can include a means for locally or remotely transferring the information relative to performing embodiments of the method of the present invention. For example, the computer can include a facsimile machine 106 for transmitting information to other facsimile machines, computers or the like. Additionally, or alternatively, the computer can include a modem 108 to transfer information to other computers or the like. Further, the computer can include an interface (not shown) to a network, such as a local area network (LAN), and/or a wide area network (WAN). For example, the computer can include an Ethernet Personal Computer Memory Card International Association (PCMCIA) card configured to transmit and receive information to and from a LAN, WAN or the like.

In one advantageous technique applicable to embodiments of the present invention, the methods according to embodiments of the present invention may be embodied in a software or data module, component, portfolio or the like, that can be manipulated or otherwise operated within a spreadsheet software program such as Excel. Such a technique may be advantageous in a number of different contexts, such as in the context of financial modeling and analysis. In this regard, modules, components and/or portfolio that perform various financial modeling functions can be combined to gain a more complete understanding of a financial context. A brief description of such a technique as such may be applied to the present invention will now be described below.

According to such a technique, data capable of being manipulated to perform at least a portion of the methods of the present invention can be embodied in a module, which can thereafter be linked or otherwise associated with other portions of the methods of the present invention embodied in other modules so as to formulate a component. Then, if so desired, the component can be linked or otherwise associated with other components capable of performing other related methods to thereby form a portfolio. For example, methods of modeling recurring and nonrecurring costs according to embodiments of the present invention can be embodied in one module while methods of modeling demand according to embodiments of the present invention can be embodied in another module. The two modules can then be linked or otherwise associated with one another to formulate a component capable of modeling profitability based upon the cost and demand models. Then, if so desired, the component for modeling profitability can be linked or otherwise associated with another component to perform another function. For example, the component for modeling profitability can be linked or otherwise associated with a component capable of forecasting revenue over time to thereby create a business case for the good. In this regard, such a component capable of forecasting revenue over time may operate according to U.S. patent application Ser. No. 10/453,396, entitled: Systems, Methods and Computer Program Products for Modeling Uncertain Future Benefits, filed Jun. 3, 2003, the contents of which are hereby incorporated by reference in its entirety.

According to one aspect of the present invention, the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 1, 2, 7, 10A, 10B, 17A and 17B are flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method performed by execution of computer-readable program code by at least one processor of at least one computer system, the method comprising:
   generating a model of a cost of a first unit of a good as a function of potential learning curve values, wherein generating a model of the cost of the first unit of the good comprises:
      selecting a unit cost to produce the good, and determining a fixed cost to produce the first unit of the good based upon the unit cost;
      determining a variance factor as a function of potential learning curve values based upon a variance and a benchmark learning curve value; and
      generating a model of the cost of the first unit of the good as a function of potential learning curve values based upon the variance factor and the fixed cost;
   determining, using at least one of the processors, the cost of the first unit of the good for a selected potential learning curve value based upon the model of the cost of the first unit of the good as a function of potential learning curve values; and
   generating, using at least one of the processors, a model of recurring costs to produce the good based upon the cost of the first unit of the good and the selected potential learning curve value.

2. A method according to claim 1, wherein determining a variance factor comprises:
   determining variance as a function of potential learning curve values;
   determining a benchmark variance based upon the variance as a function of potential learning curve values and a benchmark learning curve value; and
   determining the variance factor based upon the variance as a function of potential learning curve values and the benchmark variance.

3. A method according to claim 2, wherein determining variance includes establishing a plurality of variance values associated with different learning curve values, and fitting a curve to define a relationship between the plurality of variance values and associated learning curve values.

4. A method according to claim 1, wherein selecting a unit cost comprises repeatedly selecting different unit costs, and wherein generating a model of recurring costs comprises generating a model of recurring costs for each selected unit cost.

5. A method performed by execution of computer-readable program code by at least one processor of at least one computer system, the method comprising:
   determining, using at least one of the processors, a cost of a first unit of a good for a selected potential learning curve value based upon a model of the cost of the first unit of the good as a function of potential learning curve values;
   forecasting a market including randomly selecting a predefined number of units of the good based upon a market potential distribution;
   generating, using at least one of the processors, a model of recurring costs to produce the good based upon the cost of the first unit of the good and the selected potential learning curve value, wherein generating a model of recurring costs comprises generating a model of recurring costs further based upon the forecasted market; and
   generating a model of profitability of the good in the forecasted market based upon the recurring costs model and a demand model.

6. A method according to claim 5, wherein forecasting a market comprises repeatedly forecasting different markets, wherein generating a model of recurring costs comprises generating a model of recurring costs for a plurality of potential learning curve values for each of the forecasted markets, and wherein generating a model of profitability comprises generating a model of profitability for each recurring costs model in each of the forecasted markets.

7. A method according to claim 6 further comprising determining a learning curve value, wherein determining a learning curve value comprises:
   identifying a learning curve value for each forecasted market such that the profitability is maximized over the potential learning curve values; and
   determining a learning curve value such that the mean profitability at each identified learning curve value is maximized over the identified learning curve values.

8. A method according to claim 5, wherein the forecasted market includes a predefined number of contracts each having a predetermined number of units and a predetermined price per unit, and wherein generating a model of recurring costs comprises generating a model of recurring costs further based upon the predefined number of contracts.

9. An apparatus comprising:
   a processor configured to generate a model of a cost of a first unit of a good as a function of potential learning curve values, including being configured to:
      select a unit cost to produce the good, determining a fixed cost to produce the first unit of the good based upon the unit cost;
      determine a variance factor as a function of potential learning curve values based upon a variance and a benchmark learning curve value; and
      generate a model of the cost of the first unit of the good as a function of potential learning curve values based upon the variance factor and the fixed cost;
   wherein the processor is also configured to determine the cost of the first unit of the good for a selected potential learning curve value based upon the model of the cost of the first unit of the good as a function of potential learning curve values, and
   wherein the processor is further configured to generate a model of recurring costs to produce the good based upon the cost of the first unit of the good and the selected potential learning curve value.

10. An apparatus according to claim 9, wherein the processor being configured to determine a variance factor includes being configured to:
   determine variance as a function of potential learning curve values;
   determine a benchmark variance based upon the variance as a function of potential learning curve values and a benchmark learning curve value; and determine the variance factor based upon the variance as a function of potential learning curve values and the benchmark variance.

11. An apparatus according to claim 10, wherein the processor being configured to determine variance includes being configured to establish a plurality of variance values associated with different learning curve values, and fit a curve to define a relationship between the plurality of variance values and associated learning curve values.

12. An apparatus according to claim 9, wherein the processor being configured to select a unit cost includes being configured to repeatedly select different unit costs, and wherein the processor being configured to generate a model of recurring costs includes being configured to generate a model of recurring costs for each selected unit cost.

13. An apparatus comprising:
a processor configured to determine a cost of a first unit of a good for a selected potential learning curve value based upon a model of the cost of the first unit of the good as a function of potential learning curve values,
wherein the processor is further configured to forecast a market including being configured to randomly select a predefined number of units of the good based upon a market potential distribution,
wherein the processor is also configured to generate a model of recurring costs to produce a good based upon the cost of the first unit of the good and the selected potential learning curve value, wherein the processor is configured to generate the model of recurring costs further based upon the forecasted market, and
wherein the processor is additionally configured to generate a model of profitability of the good in the forecasted market based upon the recurring costs model and a demand model.

14. An apparatus according to claim 13, wherein the processor being configured to forecast a market includes being configured to repeatedly forecast different markets, wherein the processor being configured to generate a model of recurring costs includes being configured to generate a model of recurring costs for a plurality of potential learning curve values for each of the forecasted markets, and wherein the processor being configured to generate a model of profitability includes being configured to generate a model of profitability for each recurring costs model in each of the forecasted markets.

15. An apparatus according to claim 14, wherein the processor is further configured to determine a learning curve value including being configured to identify a learning curve value for each forecasted market such that the profitability is maximized over the potential learning curve values, and determine a learning curve value such that the mean profitability at each identified learning curve value is maximized over the identified learning curve values.

16. An apparatus according to claim 13, wherein the forecasted market includes a predefined number of contracts each having a predetermined number of units and a predetermined price per unit, and wherein the processor is configured to generate the model of recurring costs further based upon the predefined number of contracts.

17. A computer program product comprising a computer-readable storage medium having computer-readable program portions stored therein, the computer-readable program portions comprising:
a first executable portion configured to generate a model of a cost of a first unit of a good as a function of potential learning curve values, including being configured to:
select a unit cost to produce the good, determining a fixed cost to produce the first unit of the good based upon the unit cost;
determine a variance factor as a function of potential learning curve values based upon a variance and a benchmark learning curve value; and
generate a model of the cost of the first unit of the good as a function of potential learning curve values based upon the variance factor and the fixed cost;
a second executable portion configured to determine the cost of the first unit of the good for a selected potential learning curve value based upon the model of the cost of the first unit of the good as a function of potential learning curve values; and
a third executable portion configured to generate a model of recurring costs to produce a good based upon the cost of the first unit of the good and the selected potential learning curve value.

18. A computer program product according to claim 17, wherein the first executable portion being configured to determine a variance factor includes being configured to:
determine variance as a function of potential learning curve values;
determine a benchmark variance based upon the variance as a function of potential learning curve values and a benchmark learning curve value; and
determine the variance factor based upon the variance as a function of potential learning curve values and the benchmark variance.

19. A computer program product according to claim 18, wherein the first executable portion being configured to determine variance includes being configured to establish a plurality of variance values associated with different learning curve values, and fit a curve to define a relationship between the plurality of variance values and associated learning curve values.

20. A computer program product according to claim 17, wherein the first executable portion being configured to select a unit cost includes being configured to repeatedly select different unit costs, and wherein the third executable portion being configured to generate a model of recurring costs includes being configured to generate a model of recurring costs for each selected unit cost.

21. A computer program product comprising a computer-readable storage medium having computer-readable program portions stored therein, the computer-readable program portions comprising:
a first executable portion configured to determine a cost of a first unit of a good for a selected potential learning curve value based upon a model of the cost of the first unit of the good as a function of potential learning curve values;
a second executable portion configured to forecast a market including being configured to randomly select a predefined number of units of the good based upon a market potential distribution;
a third executable portion configured to generate a model of recurring costs to produce the good based upon the cost of the first unit of the good and the selected potential learning curve value, the third executable portion being configured to generate the model of recurring costs further based upon the forecasted market; and
a fourth executable portion configured to generate a model of profitability of the good in the forecasted market based upon the recurring costs model and a demand model.

22. A computer program product according to claim 21, wherein the second executable portion being configured to forecast a market includes being configured to repeatedly forecast different markets, wherein the third executable portion being configured to generate a model of recurring costs includes being configured to generate a model of recurring costs for a plurality of potential learning curve values for each of the forecasted markets, and wherein the fourth executable portion being configured to generate a model of profitability includes being configured to generate a model of profitability for each recurring costs model in each of the forecasted markets.

23. A computer program product according to claim 22, wherein the computer-readable program portions further comprise a fifth executable portion configured to determine a learning curve value including being configured to identify a learning curve value for each forecasted market such that the profitability is maximized over the potential learning curve values, and determine a learning curve value such that the mean profitability at each identified learning curve value is maximized over the identified learning curve values.

24. A computer program product according to claim 21, wherein the forecasted market includes a predefined number of contracts each having a predetermined number of units and a predetermined price per unit, and wherein the third executable portion is configured to generate the model of recurring costs further based upon the predefined number of contracts.

25. A method performed by execution of computer-readable program code by at least one processor of at least one computer system, the method comprising:
    generating a model of a cost of a first unit of a good as a function of potential learning curve values;
    determining, using at least one of the processors, the cost of the first unit of the good for a selected potential learning curve value based upon the model of the cost of the first unit of the good as a function of potential learning curve values; and
    generating, using at least one of the processors, a model of recurring costs to produce the good based upon the cost of the first unit of the good and the selected potential learning curve value.

26. A method according to claim 25, wherein generating a model of a cost of a first unit of a food comprises determining a variance factor by:
    determining variance as a function of potential learning curve values;
    determining a benchmark variance based upon the variance as a function of potential learning curve values and a benchmark learning curve value; and
    determining the variance factor based upon the variance as a function of potential learning curve values and the benchmark variance.

27. A method according to claim 26, wherein determining variance includes establishing a plurality of variance values associated with different learning curve values, and fitting a curve to define a relationship between the plurality of variance values and associated learning curve values.

28. A method according to claim 25, wherein generating a model of a cost of a first unit of a food comprises repeatedly selecting different unit costs to produce the good, and determining a fixed cost to produce the first unit of the good based upon each selected unit cost, and wherein generating a model of recurring costs comprises generating a model of recurring costs for each selected unit cost.

29. A method performed by execution of computer-readable program code by at least one processor of at least one computer system, the method comprising:
    determining, using at least one of the processors, a cost of a first unit of a good for a selected potential learning curve value based upon a model of the cost of the first unit of the good as a function of potential learning curve values;
    forecasting a market including randomly selecting a predefined number of units of the good based upon a market potential distribution; and
    generating, using at least one of the processors, a model of recurring costs to produce the good based upon the cost of the first unit of the good and the selected potential learning curve value, wherein generating a model of recurring costs comprises generating a model of recurring costs further based upon the forecasted market.

30. A method according to claim 29 wherein forecasting a market comprises repeatedly forecasting different markets, and wherein generating a model of recurring costs comprises generating a model of recurring costs for a plurality of potential learning curve values for each of the forecasted markets.

31. A method according to claim 30 further comprising determining a learning curve value, wherein determining a learning curve value comprises:
    identifying a learning curve value for each forecasted market such that profitability is maximized over the potential learning curve values; and
    determining a learning curve value such that a mean profitability at each identified learning curve value is maximized over the identified learning curve values.

32. A method according to claim 29, wherein the forecasted market includes a predefined number of contracts each having a predetermined number of units and a predetermined price per unit, and wherein generating a model of recurring costs comprises generating a model of recurring costs further based upon the predefined number of contracts.

* * * * *